United States Patent
Jeong et al.

(10) Patent No.: US 10,568,001 B2
(45) Date of Patent: Feb. 18, 2020

(54) METHOD AND APPARATUS FOR CONTROLLING TRAFFIC OFFLOADING IN A COMMUNICATION SYSTEM

(71) Applicant: Samsung Electronics Co., Ltd, Gyeonggi-do (KR)

(72) Inventors: Sangsoo Jeong, Gyeonggi-do (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 15/323,392

(22) PCT Filed: Jun. 30, 2015

(86) PCT No.: PCT/KR2015/006737
§ 371 (c)(1),
(2) Date: Dec. 30, 2016

(87) PCT Pub. No.: WO2016/003176
PCT Pub. Date: Jan. 7, 2016

(65) Prior Publication Data
US 2017/0134986 A1    May 11, 2017

(30) Foreign Application Priority Data

Jun. 30, 2014 (KR) .................. 10-2014-0080974
Oct. 6, 2014 (KR) .................. 10-2014-0134538
Nov. 4, 2014 (KR) .................. 10-2014-0152418

(51) Int. Cl.
*H04W 28/10* (2009.01)
*H04W 36/22* (2009.01)

(52) U.S. Cl.
CPC .................. *H04W 28/10* (2013.01)

(58) Field of Classification Search
CPC ........ H04W 28/10; H04W 28/12; H04W 8/02
See application file for complete search history.

(56) References Cited

U.S. PATENT DOCUMENTS

| 2005/0014492 A1 | 1/2005 | Kang et al. |
| 2011/0170411 A1 | 7/2011 | Wang et al. |

(Continued)

FOREIGN PATENT DOCUMENTS

| CN | 103716775 A | * | 4/2014 | ............ H04W 28/10 |
| KR | 1020030038319 | | 5/2003 | |

(Continued)

OTHER PUBLICATIONS

3GPP, TS GSSA: IP Flow Mobility and Seamless Wireless Local Area Network (WLAN) Offload, TS 23.261 v11.0.0, Sep. 2012, All Pages. (Year: 2012).*

(Continued)

Primary Examiner — Robert C Scheibel

(57) ABSTRACT

The present invention relates to a communication technique of fusing a 5G communication system for supporting higher data transmission rate beyond a 4G system with an IoT technology and a system thereof. The present invention may be used for an intelligent service (for example, smart home, smart building, smart city, smart car or connected car, health care, digital education, retail business, security and safety related service, or the like) based on the 5G communication technology and the IoT related technology. According to the embodiment of the present invention, when the subject that may start the traffic offloading determination or the traffic offloading process for the terminal that may access both of the 3GPP network and the non-3GPP network is elucidated or at least two traffic offloading processes are performed in parallel, each traffic offloading process may be differentiated from each other to efficiently perform the traffic offloading.

15 Claims, 14 Drawing Sheets

(56) References Cited

U.S. PATENT DOCUMENTS

| | | | |
|---|---|---|---|
| 2012/0259747 A1 | 10/2012 | Bystrom et al. | |
| 2014/0161055 A1* | 6/2014 | Chitrapu | H04W 72/12 370/329 |
| 2015/0109930 A1* | 4/2015 | Duan | H04W 28/10 370/235 |
| 2015/0351147 A1* | 12/2015 | Jain | H04W 28/0252 370/329 |
| 2016/0073289 A1* | 3/2016 | Lu | H04W 28/0289 370/229 |

FOREIGN PATENT DOCUMENTS

| | | | |
|---|---|---|---|
| KR | 1020120038504 | 4/2012 | |
| KR | 1020140052686 | 5/2014 | |
| WO | WO-2012090401 A1 * | 7/2012 | H04L 45/308 |

OTHER PUBLICATIONS

International Search Report dated Oct. 14, 2015 in connection with International Application No. PCT/KR2015/006737, 5 pages.
Written Opinion of the International Searching Authority dated Oct. 14, 2015 in connection with International Application No. PCT/KR2015/006737, 6 pages.
3GPP TS 29.212 V12.5.0, "3GPP, Technical Specification Group Core Network and Terminals; Policy and Charging Control (PCC); Reference Points (Release 12)", Jun. 28, 2014, http://www.3gpp.org/DynaReport/21212.htm, 230 pages.

* cited by examiner

METHOD AND APPARATUS FOR CONTROLLING TRAFFIC OFFLOADING IN A COMMUNICATION SYSTEM

CROSS-REFERENCE TO RELATED APPLICATION(S)

The present application claims priority under 35 U.S.C. § 365 to International Patent Application No. PCT/KR2015/006737 filed Jun. 30, 2015, entitled "METHOD AND APPARATUS FOR DETERMINING TRAFFIC OFFLOADING", and, through International Patent Application No. PCT/KR2015/006737, to Korean Patent Application No. 10-2014-0080974 filed Jun. 30, 2014, Korean Patent Application No. 10-2014-0134538 filed Oct. 6, 2014, and Korean Patent Application No. 10-2014-0152418 filed Nov. 4, 2014, each of which are incorporated herein by reference into the present disclosure as if fully set forth herein.

TECHNICAL FIELD

The present invention relates to a technology for providing a service effectively transmitting and receiving data simultaneously using 3GPP systems such as LTE and non-3GPP systems such as a wireless LAN, in a network in which the 3GPP system and the non-3GPP system coexist. More particularly, the present invention relates to a technology for performing traffic offloading when terminal may simultaneously use a 3GPP system and a non-3GPP system and selecting a decision subject of the traffic offloading.

BACKGROUND ART

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a communication system beyond 4G network or a system since the post LTE. To achieve a high data transmission rate, the 5G communication system is considered to be implemented in a super high frequency (mmWave) band (for example, like 60 GHz band). To relieve a path loss of a radio wave and increase a transfer distance of a radio wave in the super high frequency band, in the 5G communication system, beamforming, massive MIMO, full dimensional MIMO (FD-MIMO), array antenna, analog beam-forming, large scale antenna technologies have been discussed. Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) which are an advanced access technology, and so on have been developed.

Meanwhile, the Internet is evolved to an Internet of Things (IoT) network that transmits and receives information, such as things, between distributed components and processes the information, in a human-centered connection network through which a human being generates and consumes information. The Internet of Everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service by fusing and combining the existing information technology (IT) with various industries.

Therefore, various tries to apply the 5G communication system to the IoT network have been conducted. For example, the 5G communication technologies such as the technologies of the sensor network, the machine to machine (M2M), the machine type communication (MTC) are implemented by techniques such as the beam-forming, the MIMO, the array antenna, or the like. An example of the application of the cloud radio access network (cloud RAN) as the big data processing technology described above may also be the fusing of the 5G technology with the IoT technology.

Generally, mobile communication systems have been developed to provide a voice service while securing activity of a user. However, the mobile communication systems are extending their fields from a voice service to a data service. At present, the mobile communication system has been developed to provide a high-speed data service. However, since the current mobile communication systems that are providing services suffers from a resource shortage phenomenon and do not meet a user demand for higher-speed services, there is a need for a more developed mobile communication system.

To meet the requirement, standardizations for long term evolution (LTE) in the 3rd generation partnership project (3GPP) as one system that is being developed as next-generation mobile communication systems are in progress. The LTE is a technology of implementing fast packet based communication having a transmission rate up to 100 Mbps or so. For this purpose, several schemes have been discussed. For example, there are a scheme of reducing the number of nodes located on a communication path by simplifying, for example, network architecture, a scheme of approaching radio protocols to a radio channel to the extent possible, and so on.

In the mobile communication system, the terminal may simultaneously use a plurality of heterogeneous networks. In particular, the terminal may simultaneously use 3GPP access networks such as GERAN/UTRAN/E-UTRAN and non-3GPP access networks such as wireless local area network (WLAN). For example, the terminals may access the E-UTRAN to transmit and receive data and at the same time may simultaneously access the WLAN for other traffic to transmit and receive data. The traffic offloading determination may be performed in consideration of a state of the terminal, a state of the WLAN, and a state of a provider network.

DISCLOSURE OF INVENTION

Technical Problem

When the terminal uses a service connected to a specific packet data network (PDN) through the non-3GPP system, there is a need to generate a connection from the terminal to a packet data network gateway (P-GW). To increase service freedom for a provider network configuration and a user, the network is permitted to generate at least one PDN connection to the PDN having the same access point name (APN) even when one terminals are accessed through the wireless LAN. Alternatively, a method for supporting terminal to transmit and receive traffic through both of the 3GPP system and the non-3GPP system using one IP address may be permitted. At this point, an authority to decide an access network through which specific traffic is transmitted and received, that is, whether traffic is offloaded may be given to both of the terminal and the provider network. At this point, when the process for traffic offloading by the terminal starts, if the process for traffic offloading starts even at a node of a provider network, the two processes collide with each other or error possibility or inefficiency may be increased during the operation. Therefore, a method and an apparatus for solving the above problem are required.

Solution to Problem

In order to achieve the objects, according to an embodiment of the present invention, a method for terminal to transmit and receive a signal in a mobile communication system may include: transmitting a connection request message including request information for an IP flow control to a packet data network gateway (PGW); receiving a connection response message including permission information for the IP flow control from the PGW; and controlling the IP flow associated with the connection based on the permission information for the IP flow control.

In order to achieve the objects, according to another embodiment of the present invention, a method for a packet data network gateway (PGW) to transmit and receive a signal in a mobile communication system may include: receiving a connection request message including request information for an IP flow control from terminal; transmitting a connection response message including permission information for the IP flow control to the terminal; and controlling the IP flow associated with the connection based on the permission information for the IP flow control.

In order to achieve the objects, according to still another embodiment of the present invention, terminal of a mobile communication system may include: a transceiver transmitting and receiving a signal; and a controller controlling the transceiver, transmitting a connection request message including request information for an IP flow control to a packet data network gateway (PGW), receiving a connection response message including permission information for the IP flow control from the PGW, and controlling the IP flow associated with the connection based on the permission information for the IP flow control.

In order to achieve the objects, according to yet another embodiment of the present invention, a packet data network gateway (PGW) of a mobile communication system may include: a transceiver transmitting and receiving a signal; and a controller controlling the transceiver, receiving a connection request message including request information for an IP flow control from terminal, transmitting a connection response message including permission information for the IP flow control to the terminal; and controlling the IP flow associated with the connection based on the permission information for the IP flow control.

Advantageous Effects of Invention

In accordance with the embodiments of the present invention, when the subject that may start the traffic offloading determination or the traffic offloading process for the terminal that may access both of the 3GPP network and the non-3GPP is elucidated or at least two traffic offloading processes are performed in parallel, each traffic offloading process may be differentiated from each other to efficiently perform the traffic offloading.

MODE FOR THE INVENTION

Figure 1:
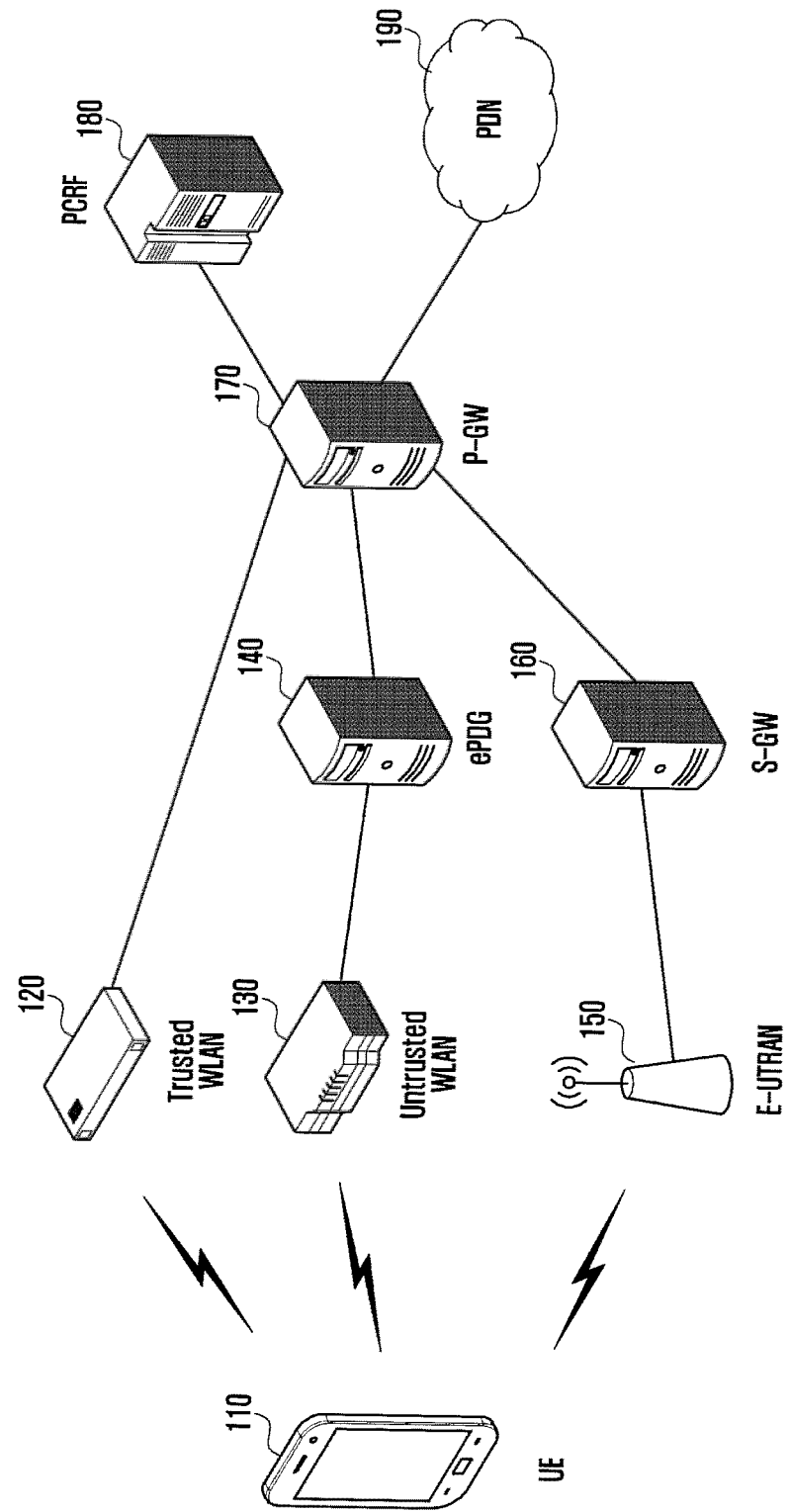
FIG. 1 is a diagram schematically illustrating conditions in which user equipment (UE) 110 according to an embodiment of the present invention simultaneously uses a 3GPP access network and a non-3GPP access network to transmit and receive data.

Hereinafter, embodiments of the present invention will be described in detail with reference to the accompanying drawings.

In describing the embodiments of the present invention, a description of technical contents which are well known to the art to which the present invention belongs and are not directly connected with the present invention will be described. This is to more clearly transfer a gist of the present specification by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present invention and methods accomplishing the same will become apparent from the following detailed description of embodiments with reference to the accompanying drawings. However, the present invention is not limited to the embodiments disclosed herein but will be implemented in various forms. The embodiments have made disclosure of the present invention complete and are provided so that those skilled in the art can easily understand the scope of the present invention. Therefore, the present invention will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in each block of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in each block of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously shown may be simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit is not limited to software or hardware. The'~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more CPUs within a device or a security multimedia card.

Further, in describing in detail the embodiments of the present specification, the basic third generation partnership project (3GPP) LTE system and the wireless local area network (called WiFi) as a non-3GPP access network are mainly described, but the main gist of embodiments of the present specification can be applied to other communication/computer systems having similar technical background and system forms, while bing slightly changed without greatly departing from the scope of the embodiment of the present specification, which may be implemented by a decision of a person having ordinary skill in the art to which the present invention pertains.

For example, applications of the present invention may be a 1x/CDMA2000 system or a WiMAX system, instead of WLAN.

FIG. 1 is a diagram schematically illustrating conditions in which user equipment (UE) 110 according to an embodiment of the present invention simultaneously uses a 3GPP access network and a non-3GPP access network to transmit and receive data.

Referring to FIG. 1, only WLANs 120 and 130 as the non-3GPP access network are illustrated. However, as described above, the non-3GPP access network may include other non-3GPP standard access networks, such as 1x/CDMA2000/HPRD access network and WiMAX network, in addition to the WLAN.

The non-3GPP access network may be largely classified into a trusted non-3GPP access network 120 and an untrusted non-3GPP access network 130. The classification may be decided depending on whether a provider may trust a non-3GPP access network connected to a provider network. If the non-3GPP access network is not trusted (untrusted non-3GPP access network 130), the non-3GPP access network may be connected to a 3GPP provider network, for example, a PDN gateway (P-GW) 170 through an evolved packet data gateway (ePDG) 140. According the embodiment, the provider may include a provider that operates the 3GPP access network and the non-3GPP access network may be a service provider that makes a contract with the 3GPP provider.

In contrast, the trusted non-3GPP access network 120 may be directly connected to the P-GW 170 without the ePDG. The trusted non-3GPP access network 120 may be directly connected to an evolved packet core (EPC).

For convenience of description, FIG. 1 illustrates the non-3GPP access networks 120 and 130 as a single apparatus, but the non-3GPP access network may be a network consisting of a plurality of access points. In particular, when the trusted non-3GPP access network is configured as the WLAN, it is called a trusted WLAN access network (TWAN) 120 which may include at least one WiFi access point and a trusted WLAN access gateway (TWAG).

That is, the WiFi access point is connected to a 3GPP provider network through the TWAG, in which the TWAG may be implemented while physically separated from the WiFi access point or otherwise may be implemented in one apparatus through a separate logical module.

Meanwhile, as illustrated in FIG. 1, the user equipment may also use a non-seamless WLAN offloading (NSWO) technology that directly transmit and receive traffic to and from an external PDN (for example, Internet) through the trusted WLAN 120 or the untrusted WLAN 130, without passing a provider core network.

According to the embodiment, the 3GPP mobile communication system, in particular, the LTE system may include a next-generation evolved node B (EUTRAN, ENB, Node B) 150 and a serving gateway (S-GW) 160 and the user equipment 110 may be connected to an external network through the ENB 150, the S-GW 160, and the P-GW 170. The P-GW generally has a policy and charging enforcement function (PCEF). Here, if the PCEF is separately implemented from the P-GW, according to the embodiment of the present invention, the P-GW may be replaced by the PCEF.

A policy and charging rules function (PCRF) 180 which is an apparatus for controlling a policy associated with a quality of service (QoS) of a user may transfer a policy and charging control (PCC) rule corresponding to a policy to the P-GW 170.

The eNB 150 is a radio access network (RAN) node and may perform a function corresponding to a radio network controller (RNC0 of a UTRAN system and a base station controller (BSC) of a GERAN system. The eNB 150 is connected to the UE by a radio channel and performs a similar role to the existing RNC/BSC. Further, the base station 150 may simultaneously use several cells. Therefore, the embodiments of the present specification may be applied to a 2G/3G legacy network when the eNB (E-UTRAN) 150 is replaced by the UTRAN or the GERAN.

The S-GW 160 is an apparatus for providing a data bearer and generates or removes a data bearer context according to a control of mobility management entity (MME). The function of the S-GW 160 may correspond to a function of a serving GPRS support node (SGSN) in the 2G/3G network.

In the wireless communication system like the LTE, a unit in which QoS may be applied is an EPS bearer. One EPS bearer is used to transmit IP flows having the same QoS requirements. The EPS bearer may include a QoS related parameter that may include a QoS class identifier (QCI) and allocation and retention priority (ARP).

According to the embodiment, the EPS bearer may correspond to a PDP context of a GPRS system. When the user equipment 110 is connected to an evolved packet core through the 3GPP or the non-3GPP access network, the user equipment 110 generates a PDN connection and may be allocated IP addresses per the PDN connection, in which the PDN connection may include at least one EPS bearer. Hereinafter, in describing the embodiment of the present invention, the term "PDN connection or connection' may be understood as a concept including a logical path so that the user equipment may transmit and receive data to and from the PDN through the core network based on an IP address.

Figure 2:
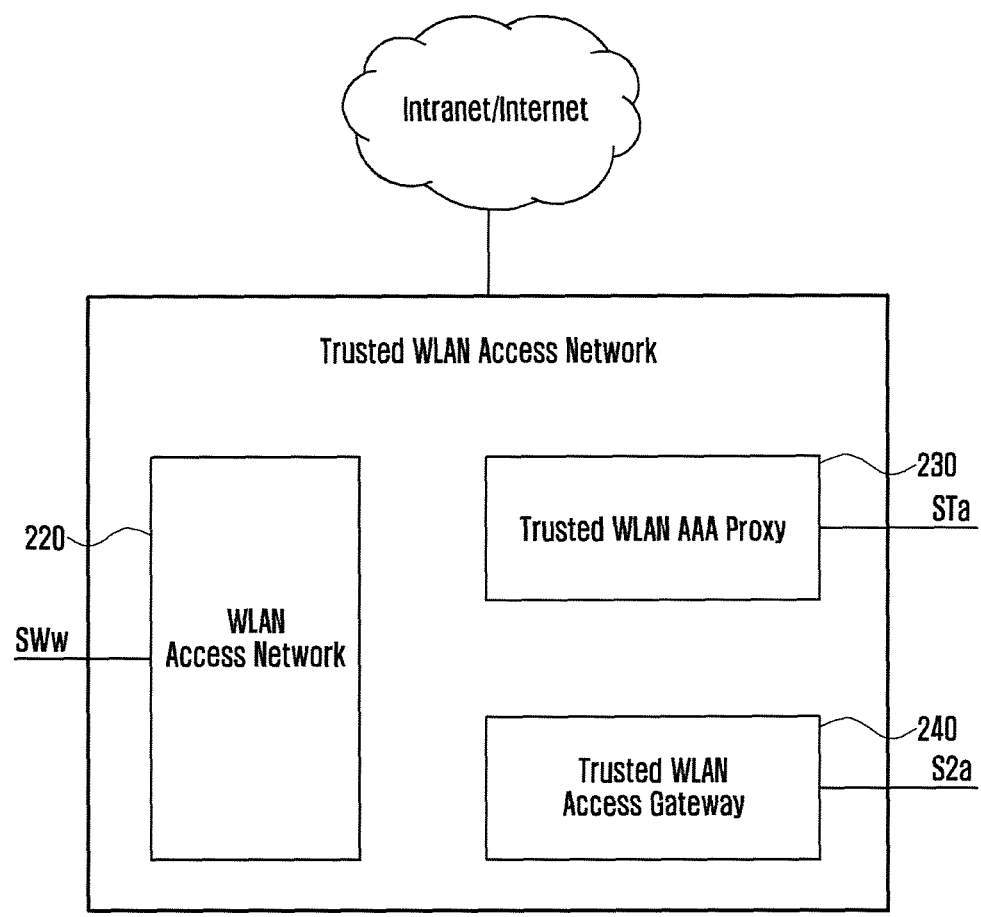
FIG. 2 is a diagram illustrating an example of a block configuration diagram of a trusted WLAN access network (TWAN) according to an embodiment of the present invention.

FIG. 2 is a diagram illustrating an example of a block configuration diagram of a trusted WLAN access network (TWAN) according to an embodiment of the present invention. In more detail, the TWAN of FIG. 2 may be considered as a kind of trusted non-3GPP access network described with reference to FIG. 1.

Referring to FIG. 2, a trusted WLAN access network (TWAN) 120 may include a WLAN access network 220 consisting of at least one WLAN, a trusted WLAN AAA proxy 230 for linking with AAA, and a trusted WLAN access gateway (TWAG) 240 connecting between the WLAN access network 210 and the P-GW (not illustrated).

An interface between the TWAG 240 and the P-GW may be called S2a. Here, protocols such as GPRS tunneling protocol (GTP) and proxy mobile IP (PMIP) may be used. The structure is only a logical structure, but actually, the physical structure may be more free. Further, according to the embodiment, the WLAN access network 220 and the TWAG 240 may be implemented in the physically same entity in the communication system.

Hereinafter, the above-mentioned problem, that is, a method for generating or managing a connection when user equipment may simultaneously use a non-3GPP access network and a 3GPP access network and a method for deciding and notifying to which access network specific traffic is transmitted depending on user subscription information or a network state will be described with embodiments. However, the present invention is not limited to the embodiments, and therefore it is obvious to those skilled in the art to which the present invention pertains that various modifications may be made without departing from the scope of the present invention, in addition to the embodiments disclosed herein.

In describing the embodiment of the present specification, for simplicity of description, the case in which the network configuration includes the TWAN as the non-3GPP access network will be mainly described, but the main gist of the present invention may be applied under any circumferences in which the present invention uses the PDN through the non-3GPP access network. That is, if the provider network configuration uses the untrusted WLAN, according to the embodiment of the present invention, the TWAN may be replaced by the ePDG, in which the ePDG may be replaced by one that transmits and receives a message to and from the user equipment through the untrusted WLAN.

Meanwhile, in describing the embodiment of the present invention, IP flow control information may include information that may identify an IP flow, which may indicate all information that may be used to detect specific IP flows such as traffic flow templates (TFT), packet filter, IP flow descriptor, and service data flow (SDF) template.

In the present specification, the TWAN and the WLAN may be used together for convenience of description. Further, for convenience of description, the WLAN may be called entities that are in charge of a control, for example, WLAN access point (WLAN AP), TVVAG, or ePDG. Further, simplicity of description, the case in which entity that communicates with the user equipment (UE) is the TWAN will be basically described, but the entity that actually communicates with the UE by the protocol of the message with which the UE is actually exchanged may be at least one element (that is, at least one of WLAN access network, TWAG, and TWAP) within the TWAN. For example, a beacon message may be transmitted by the WLAN access network within the TWAN. Further, an access network query protocol (ANQP) method may be applied between the UE and the WLAN access network within the TWAN or an ANQP server connected thereto or the TVVAG. Further, a WLAN control layer message (WLAN control protocol (WLCP)) may be exchanged between the UE and the TWAG.

If the non-3GPP access network is untrusted, the information exchanged between the user equipment and the ePDG is included in an Internet key exchange (IKE) message, not the WLAN control layer message and may be transferred through the non-3GPP access network. If the user equipment directly exchanges information with the WLAN access network, an EAP message may be used.

Further, in the present specification, the information exchange between the WLAN and the PCRF will be described as establishment, modification, and termination of gateway control session and the information exchange between the PGW and the PCRF will be described as establishment, modification, and termination of IP-CAN session, but actually, the process may correspond to the case in which the WLAN or the PGW transmits a credit control request (CCR) message including the information described in the foregoing embodiment to the PRCF and the case in which the PCRF transmits a credit control answer (CCA) message including the information included in the foregoing embodiment to the WLAN or the PGW. Transmitting, by the PCRF, the information described in the embodiment of the present invention to the WLAN or the PGW in which the PCRF is not requested may correspond to transmitting, by the PCRF, an Re-Auth (RA) request message including the information described in the embodiment to the WLAN or the PGW and making, by the WLAN or the PGW receiving the RA request message, respond to the PCRF, including an Re-Auth (RA) answer message including the information included in the embodiment. Further, in applying the embodiments of the present invention, a diameter message is not limited to the foregoing, and therefore may be changed to other similar request/response messages and used. In the present specification, one entity may transfer the information described in the embodiment of the present specification to other entities and may perform the operation described in the embodiment of the present specification based on the transferred information.

Meanwhile, as described above, the embodiments of the present invention will basically describe the case in which the user equipments are simultaneously allocated one IP address through the non-3GPP access network and the 3GPP access network and use the allocated IP address, but the embodiments of the present invention may also be applied to the case in which the user equipments are allocated different IP addresses through the non-3GPP access network and the 3GPP access network and use the allocated IP addresses. In this case, the embodiments of the present invention are limited to the case having the connection to the same PGW and the information transmitted and received between the user equipment and each network entity needs to include information (IP address, connection identifier, identifier of basic bearer included in the connection, or the like) capable of identifying the connection that is a subject of an operation.

Meanwhile, in describing the embodiments of the present invention, the SGW may be partially omitted in the message exchange process of each embodiment. If one network entity, in particular, the MME exchanges a message with the PGW, the message may be exchanged with the PGW through the SGW. That is, the SGW may transfer a control message received from the MME to the PGW and transfer the message received from the PGW to the MME. In this case, an information element included in a GTP message that is generated by the SGW and transferred to a next hop may use one received from a previous hop.

Meanwhile, in describing the embodiments of the present invention, a start of a traffic offloading determination or a traffic offloading process may correspond to selecting IP flow mobility, that is, an access network through which specific traffic will be transmitted, deciding whether one access network is changed to another access network, or starting the process for the same. Further, in describing the embodiments of the present invention, the WLAN may be a concept corresponding to one of the AP, the TWAG, and the ePDG of the WLAN or including all of them. In more detail, the WLAN may include at least one of the AP, the TWAG, and the ePDG and may be logically or physically collocated together.

Hereinafter, problems to be solved by the embodiments of the present specification will be briefly described.

Figure 3:
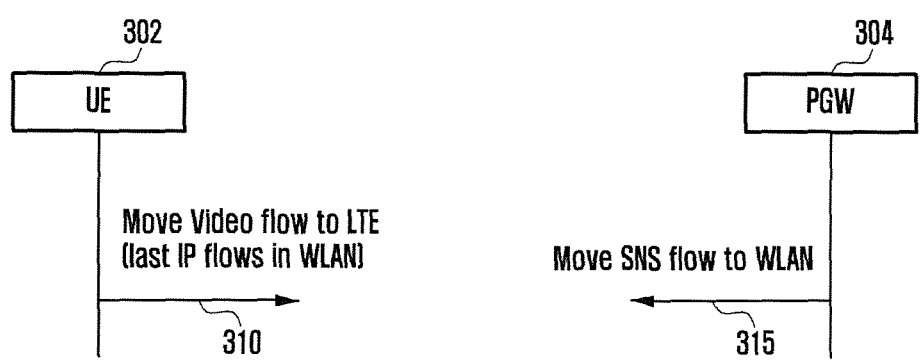
FIG. 3 is a diagram for schematically describing conditions that may be generated during a process for determining traffic offloading.

FIG. 3 is a diagram for schematically describing conditions that may be generated during a process for determining traffic offloading. In more detail, FIG. 3 is a diagram schematically illustrating problems that may occur when the user equipment and the network decide the traffic offloading.

According the embodiment, user equipment (UE) 302 and PGW 304 each may transmit and receive a signal and according to the embodiment, it may be assumed that an authority to make a decision on IP flow mobility is given to the user equipment 302 and one node (PGW) 304 of the provider network. Further, it may be assumed that the user equipment 302 may simultaneously use the 3GPP access network and the non-3GPP access network using one IP address.

In step I, the user equipment 302 decides that the specific IP flow is transmitted to the LTE depending on a specific state and condition while transmitting the specific IP flow (in the present example, traffic for a video service) to the WLAN and starts the process for the IP flow mobility. At this point, according to the embodiment, the IP flow is a final or unique IP flow of the PDN connection through the WLAN and therefore moving the IP flow to the LTE may include the case in which the PDN connection through the WLAN is no longer used.

Meanwhile, in step 315, one node (in the embodiment, PGW 304) of the provider network decides to move the specific IP flow (in the present example, traffic for an SNS service) transmitted to the LTE in consideration of the state of the provider network, the state of the user equipment, or the like to the WLAN and may start the process for the same. The operation of the step 315 may be performed at a similar time to the operation of the step 310 and each step may also be performed within a time range in which they may affect each other regardless of order.

By the above conditions, the operations of the user equipment 302 and the node 304 of the provider network may induce results different from an original intent or induce error conditions. For example, if the process of the step 310 in which the user equipment 302 starts is completed before the request message depending on the process of the step 315 in which the node 304 of the provider network starts arrives at the user equipment 302, the user equipment 302 receives a command to transmit traffic from the node 304 of the provider network to the PDN connection that already disappears. On the other hand, if the request message depending on the process of the step 315 in which the provider network 304 starts arrives at the user equipment 302 before the process in which the user equipment 302 starts is completed, the user equipment 302 may not perform the originally intended operation (that is, PDN connection release through the WLAN).

In the embodiment of the present specification, to solve the above-mentioned circumference (s), a method for binding operations of a user equipment 302 performed for IP flow mobility and nodes 304 of a provider network into one transaction and separating the user equipment 302 from the nodes 304 of the provider network by differentiating each transaction not to have an effect on each other is proposed.

Meanwhile, to minimize unnecessary ambiguity that may occur due to the operation of the IP flow mobility, the user equipment and the provider network may perform the process associated with the IP flow mobility through a new access network through which the IP flow will be always transmitted and received due to the operation of the IP flow mobility. For example, if the user equipment decides to move the IP flow transmitted and received to and from the LTE to the WLAN, the user equipment may transmit an IP flow mobility request message through the WLAN, not through the LTE. As another example, if one node of the provider network decides to move the IP flow transmitted and received to and from the WLAN to the LTE, the control message exchanged with the user equipment during the process for the IP flow mobility may be transmitted through the LTE network.

Figure 4:
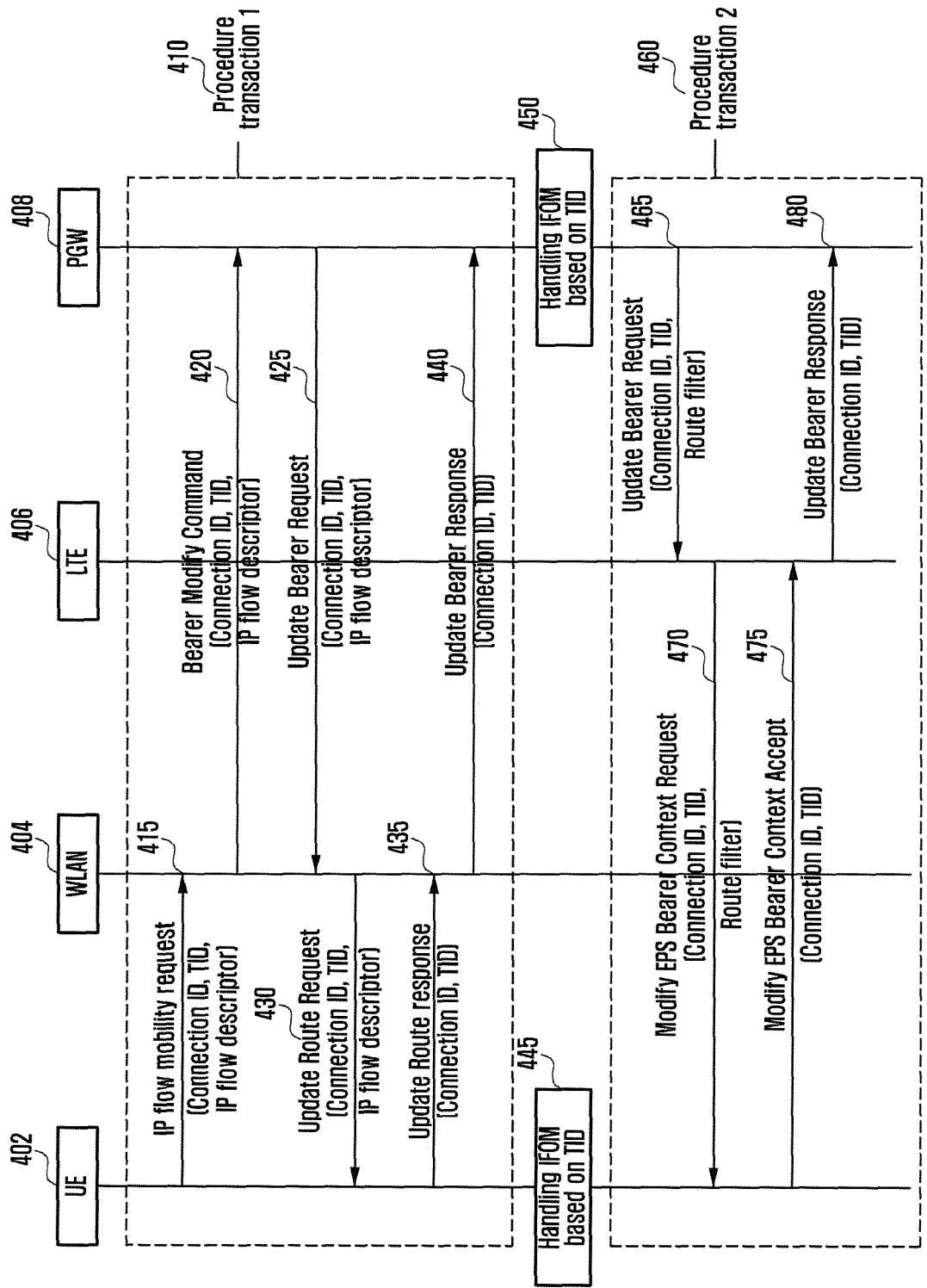
FIG. 4 is a diagram illustrating an operation of user equipment and provider network nodes according to an embodiment of the present invention.

FIG. 4 is a diagram illustrating an operation of user equipment and provider network nodes according to an embodiment of the present invention.

Referring to FIG. 4, according to the embodiment, at least one of user equipment 402, a non-3GPP access network 404, a 3GPP network 406, and PGW 408 may transmit and receive a signal to and from other entities/networks.

In FIG. 4, two procedure transactions (hereinafter, referred to as PT) 410 and 460 are included, in which the two PTs 410 and 460 may be performed in parallel with each other. For convenience of description, the PT1 410 describes that the user equipment 402 initiates the IP flow mobility and the PT2 460 describes that one node (PGW) 408 of the provider network initiates the IP flow mobility. According to the embodiment, to initiate an order of the PT or the IP flow mobility at each PT, each entity may differently decide a kind of transmitted messages depending on the entities receiving a message.

Further, according to the present embodiment, the state in which the user equipment 402 may generate the PDN connection to use the 3GPP access network (LTE/E-UTRAN, or the like) 406 and the non-3GPP access network (WLAN, or the like) 404 together at one IP address is assumed.

In the PT1 410, it may be decided that the user equipment 402 moves the IP flow transmitted from one access network to other access networks.

In step 415, the user equipment 402 may transmit the IP flow mobility request message through the access network 404. If in the embodiment, the WLAN is used, the WLAN is a trusted WLAN, and the user equipment 402 uses a multiple connection mode, the user equipment 402 may use a WLCP request message and the IP flow mobility request message. According to the embodiment, at least one of the messages may include at least one of ID capable of identifying the connection, the IP flow information (information that may identify the IP flow, TFT or packet filter consisting of an IP address/port, or the like, and information representing a kind of target access networks, or the like), and a transaction ID (TID). According to the embodiment, the TID which is an identifier for identifying a session management procedure transaction is a value that the user equipment 402 may allocate.

In step 420, the access network node 404 that receives the IP flow mobility request from the user equipment 402 may transmit a message for updating the IP flow information up to the PGW 408, a bearer modify command, or a proxy binding update (PBU) message to the PGW 408. The message may include at least one of the ID capable of identifying the connection, the IP flow information, and the TID and the information may be generated based on the values received from the user equipment 402.

In step 425, the PGW 408 decides whether to apply the IP flow mobility based on the received information and if it is determined that the IP flow mobility is applied, may transmit the message for updating the information on IP flow (that is, access network through which the IP flow will be transmitted and received), an update bearer request, or a proxy binding Ack (PBA) message to the access network node 404. At least one of the messages may include at least one of the ID capable of identifying the connection, the IP flow information, and the TID. Further, the IP flow information may be information modified/updated based on the information received from the user equipment 402 and the TID is decided based on the value received from the user equipment 402, in more detail, uses the value received from the user equipment 402.

In step 430, the access network 404 may transmit the message for updating the IP flow information of the user equipment 402 to the user equipment 402. According to the embodiment, if the access network 404 is the WLAN and the WLAN is the trusted WLAN, the message may be at least one of a WLCP message and an update route request message. The message may include at least one of the ID capable of identifying the connection, the IP flow information, and the TID. According to the embodiment, the IP flow information may be information modified/updated based on the information that the user equipment 402 requests. The user equipment 402 compares the TID of the message received from the provider network in the present step with the TID inserted into the message transmitted in the process of the step 415 before the present step and if it is determined that the TIDs match each other, it may be appreciated that the provider network transmits the message for performing the operation of the IP flow mobility due to the request transmitted by the user equipment 402.

In step 435, the user equipment 402 may transmit a response message representing an acceptance of the IP flow mobility to the access network 404. If the access network 404 is the WLAN and the WLAN is the trusted WLAN, the message may be at least one of the WLCP message, an update route response, and an accept message. According to the embodiment, the message may include at least one of the ID capable of identifying the connection and the TID and the TID may be decided based on the TID received in the previous step 430, in more detail, may use a value like the TID received in the step 430.

In step 440, the access network 404 may transmit the response message to the operation that the PGW 408 requests, if necessary. The response message may be an update bearer response message that may include at least one of the ID capable of identifying the connection and the TID. The PGW 408 may compare the TID of the received message with the TID (that is, obtained from the request message of the user equipment) included in the message transmitted in the previous step 425 to decide to which PT the response message is a response message.

Meanwhile, to allow one node of the provider network, in the embodiment, the PGW 408 to start the IP flow mobility, in step 465, the PGW 408 may transmit the message for updating the IP flow information of the user equipment 402 to the access network 406 and in the embodiment, the message may be an update bearer request message. The message may include at least one of the ID capable of identifying the connection, the IP flow information, and the TID. Further, according to the embodiment, the TID may be decided based on an unassigned value or a value generated by the PGW.

In step 470, the access network 406 may transmit the message for updating the IP flow information of the user equipment 402 to the user equipment 402 and the message for updating the IP flow information may be a message for changing the access network through which the IP flow is transmitted and received. According to the embodiment, if the access network 406 is the LTE, the message may be at least one of a NAS ESM message and a modify EPS bearer context request message. The message may include at least one of the ID capable of identifying the connection or a representative EPS bearer of the connection, the IP flow information (at least one of information that may identify the IP flow, TFT or packet filter consisting of an IP address/port, or the like, and information representing a kind of target access networks), and the transaction ID (TID). According to the embodiment, the TID which the access network 406 transmits to the user equipment 402 may be decided based on the value received from the PGW 408, and more particularly, the TID value received from the PGW 408 may also be used as it is.

In step 475, the user equipment 402 may transmit a response message representing an acceptance of the IP flow mobility to the access network 406. If the access network 406 is the LTE, the message may be at least one of the NAS ESM message and the modify EPS bearer context accept message. The message may include at least one of the ID capable of identifying the connection or the representative EPS bearer of the connection and the TID. According to the embodiment, if the TID of the message received in the foregoing step is the unassigned, the user equipment 402 may allocate one TID value to include the allocated one TID value in the message or may include the unassigned as it is. When the message received in the foregoing step includes the TID, not the unassigned, the user equipment may include the TID received in the foregoing step in the message.

In step 480, the access network 406 may transmit the response message to the operation that the PGW 408 requests. According to the embodiment, the response message may be an update bearer response message that may include at least one of the ID capable of identifying the connection and the TID. Here, the TID is decided based on the value included in the message received from the user equipment 402, and more particularly, may use the same value as the TID included in the message received from the user equipment 402.

The PGW 408 may compare the TID of the received message with the TID (that is, obtained from the request message of the user equipment) included in the message transmitted in the previous step 465 to decide to which PT the response message is a response message.

According to the embodiment, like steps 445 and 450, the user equipment 402 and the PGW 408 may process the IP flow mobility (IFOM) based on the TID.

Meanwhile, according to the embodiment, the example in which the PT1 410 allows the user equipment 402 to transmit the IP flow mobility request through the WLAN 404 and the PT2 460 allows the provider network to perform the process for the IP flow mobility through the LTE 406 is described, but the embodiment relates to the method for identifying IP flow mobility PT that the user equipment starts and the IP flow mobility PT that the provider network starts and may be similarly applied to another example even in the case in which the user equipment 402 transmits the IP flow mobility request through the LTE 406. That is, according to the drawings, the user equipment transmits the IP flow mobility request through the non-3GPP (WLAN) access network, one node (PGW) of the network performs the IP flow mobility operation through the 3GPP (LTE) access network. Here, the main gist of the present embodiment may be applied even to the case in which the kind of access networks is changed and thus the user equipment transmits the IP flow mobility request through the LTE network and performs the process for the IP flow mobility through the WLAN network in the network.

Further, according to the embodiment, when the SGW is present between the access network and the PGW, the operation of the SGW is omitted for convenience of description. The reason is that the message that the SGW transmits and receives may be the same as the message that the PGW transmits and receives.

Hereinafter, according to the embodiment of the present invention, a method for deciding a node that serves to allow any one of the user equipment and the provider network node to start the process for the IP flow mobility will be described. If it may be decided only which one of the user equipment and the provider network node starts the process for the IP flow mobility, as described above, the problems occurring at the time of managing the IP flow or the PDN connection may be prevented.

Hereinafter, in describing the embodiments of the present invention, a mode (IFOM control mode, hereinafter, referred to as ICM for short) for controlling the IP flow mobility is three.

UE only: only the user equipment may perform the initiation for the IP flow mobility Network (NW) only: Only the node (for example, PGW) of the provider network may perform the initiation for the IP flow mobility NW and UE: Both of the UE/NW may perform the initiation for the IP flow mobility According to the embodiment, it is apparent that names of the modes are exemplary but may be changed to terms that may be understood by those skilled in the art and used.

Figure 5:
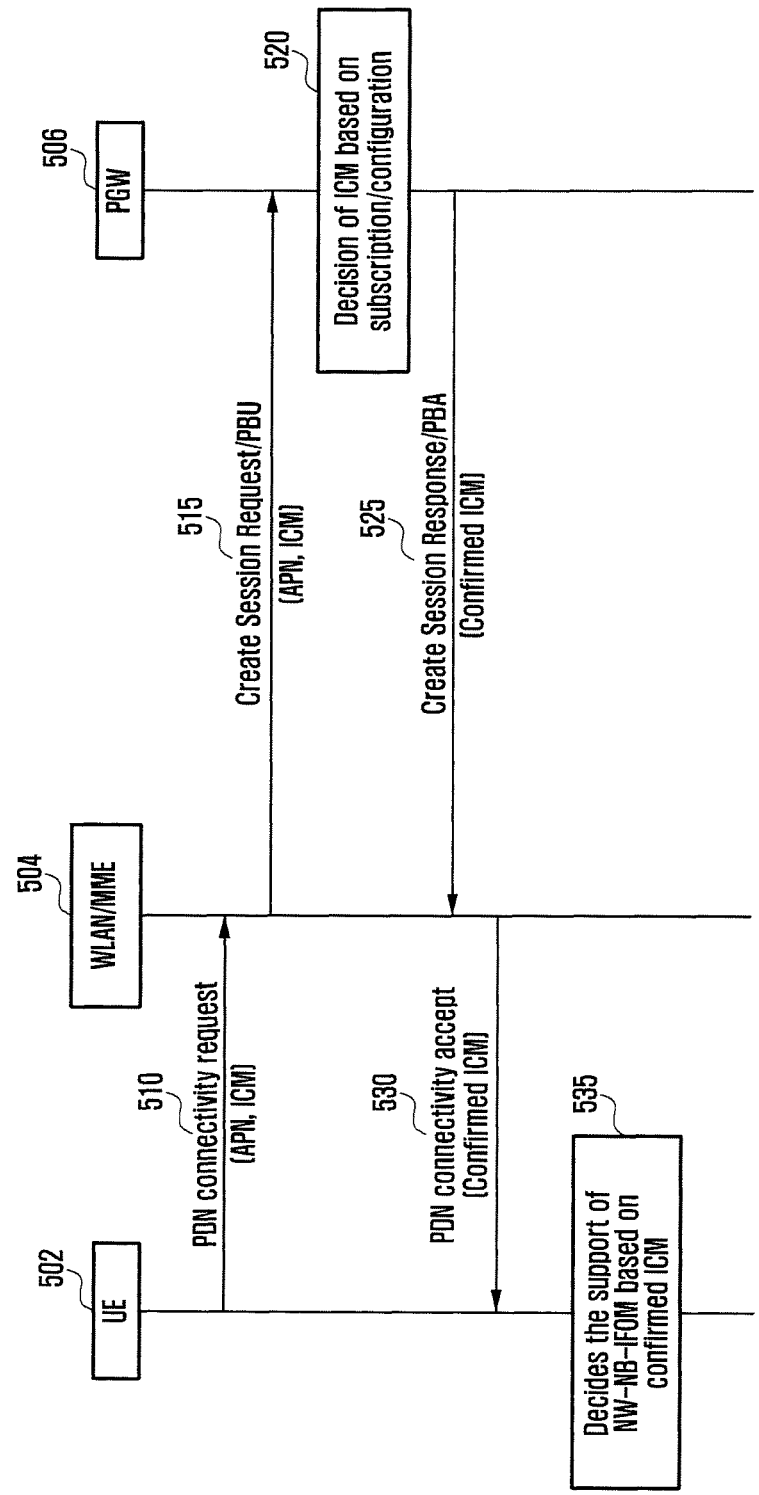
FIG. 5 is a diagram illustrating an operation for deciding ICM for the user equipment and a network.

FIG. 5 is a diagram illustrating an operation for deciding ICM for the user equipment and a network. Referring to FIG. 5, according to the embodiment, user equipment 502, WLAN/MME 504, and PGW 506 may each transmit and receive a signal to and from at least one of different entities.

In step 510, the user equipment 502 may transmit a request message for generating the PDN connection to the WLAN/MME 504. If the access network is the WLAN and the WLAN is the trusted WLAN, the message may be the WLCP message. Further, when the access network is the E-UTRAN, the message may be the NAS ESM message. Further, according to the embodiment, the message may be a PDN connectivity request message that may include at least one of the APN and the ICM that the user equipment requests.

In step 515, the WLAN network or MME 504 may transmit a message for generating the PDN connection, a create session request message or a PBU message up to the PGW 506, according to the request of the user equipment 502. The message may include at least one of the APN and the ICM.

In step 520, the PGW 506 may decide the ICM for the user equipment 502. At this point, the PGW 506 may consider the APN requested from the user equipment 502 and may determine whether to permit the ICM that the user equipment 502 requests or whether to need to change to another ICM. Further, during the process, the PGW 506 may consider the local configuration and the user subscription information and may also use the information received from a separate network node, for example, the PCRF. Alternatively, the PGW 506 may transmit the ICM that the user equipment 502 requests to the PCRF and may again notify the user equipment 502 of the ICM that the PCRF decides.

In step 525, the PGW 506 may transmit the response message to the request to the WLAN/MME 504. According to the embodiment, the message may be a create session response or PBA message. The message may include the ICM for the corresponding PDN connection of the finally decided user equipment 502.

In step 530, the WLAN/MME 504 may transmit the response message to the PDN connection generation request to the user equipment 502. If the access network is the WLAN and the WLAN is the trusted WLAN, the message may be the WLCP message. Further, when the access network is E-UTRAN, the message may be the NAS ESM message. The message may be a PDN connectivity accept message (in the case of WLCP) or an activate default bearer request (in the case of NAS ESM) message that may include the ICM to be applied to the user equipment 502. According to the embodiment, the ICM to be applied may include at least one of the ICM value or the ICM related information to be applied. Further, the ICM related information may include the PDN related information to which the ICM is applied or at least one of the conditions in which the ICM will be applied.

In step 535, the user equipment 502 sets a network-based IP flow mobility (NB-IFOM) operation mode, that is, at least one of UE-only, NW-only, and NW and UE depending on the received message and then may apply the set mode to the IFOM operation. Further, according to the present embodiment, the operation mode may be restrictively applied to the targeted PDN connection.

Figure 6:
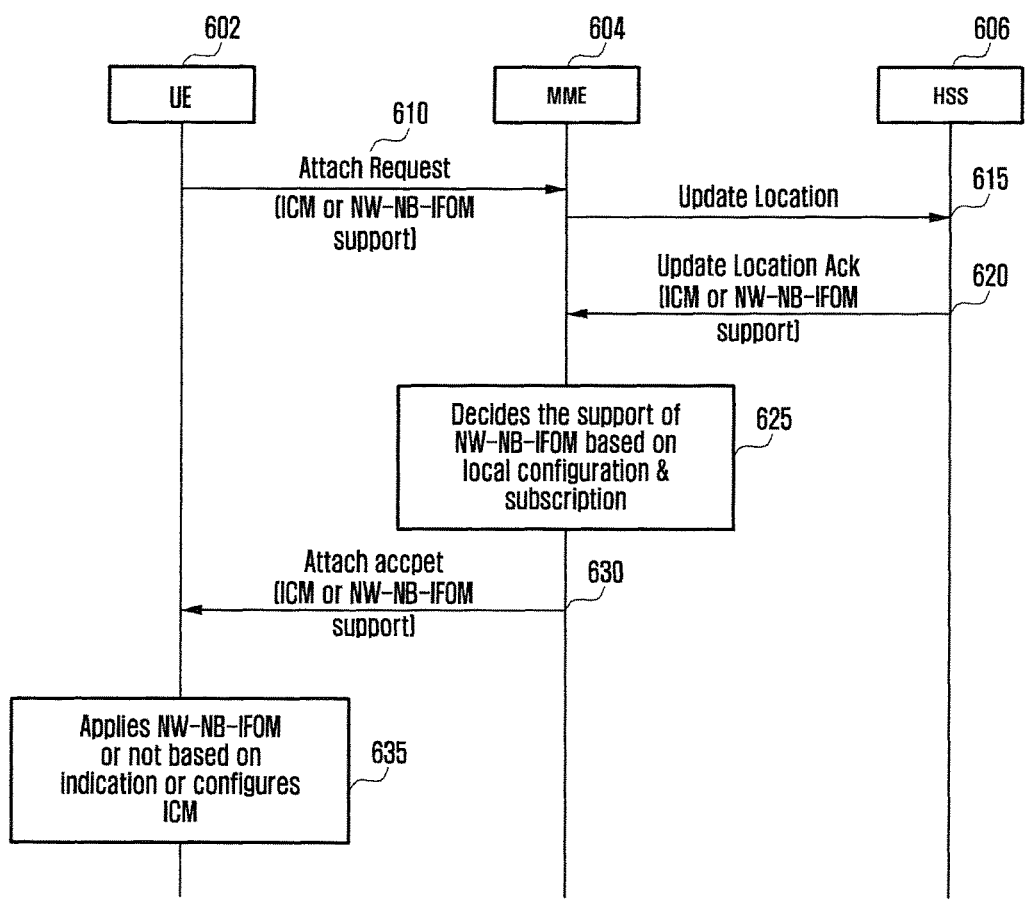
FIG. 6 is a diagram illustrating an operation of the user equipment and the network for deciding an IFOM operation mode.

FIG. 6 is a diagram illustrating an operation of the user equipment and the network for deciding an IFOM operation mode.

Referring to FIG. 6, according to the embodiment, user equipment 602, WLAN/MME 604, and a home subscriber server (HSS) 606 may each transmit and receive a signal to and from at least one of different entities.

In step 610, the user equipment 602 may perform registration (attach or TAU) in EPC through the E-UTRAN. The user equipment 602 transmits an attach request or a TA update request message to the MME 604 and the TA update request message may include at least one of information requesting application of the ICM for the user equipment 602 or NW-initiated IP flow mobility to the user equipment 602.

In step 615, the MME 604 transmits a message requesting the location registration of the user equipment 602 to the HSS 606. According to the embodiment, the message may be an update location message.

In step 620, the HSS 606 may transmit a response message to the request of the MME 604. The response message may be an update location Ack message that may include the information representing whether to apply the ICM to be applied to the user equipment or the NW-initiated IP flow mobility to the user equipment as one of the subscription information of the user equipment 602.

In step 625, the MME 604 may determine whether to support the ICM or the NW-initiated IP flow mobility to be applied to the user equipment 602 based on at least one of the information that the user equipment 602 requests in the step 610, the information received from the HSS 606 in the step 620, and the local configuration of the MME 604.

In step 630, the MME 604 may transmit at least one of the information representing whether to apply the ICM to the user equipment 602 and whether to support the NW-initiated IP flow mobility to the user equipment by including at least one of the information in a registration accept message, an attach accept message, or a TA update access message that is transmitted to the user equipment 602.

In step 635, the user equipment 602 may apply to which of the UE-only, the NW-only, and the NW and UE its operation mode corresponds or whether to support the NW-initiated IP flow mobility, depending on the message received from the MME 604.

According to the embodiment, the support of the NW-initiated IP flow mobility means that instead of the user equipment 602, the node of the provider network, for example, the PGW or the PCRF may decide the IP flow mobility and the procedure for the same may start Meanwhile, according to the present embodiment, the information (ICM or NW-initiated IP flow mobility) may be transmitted to the user equipment while being set per the APN. In this case, the user equipment needs to be operated depending on the setting of the currently targeted APN. Further, the information may also be differently set per the APN.

Figure 7:
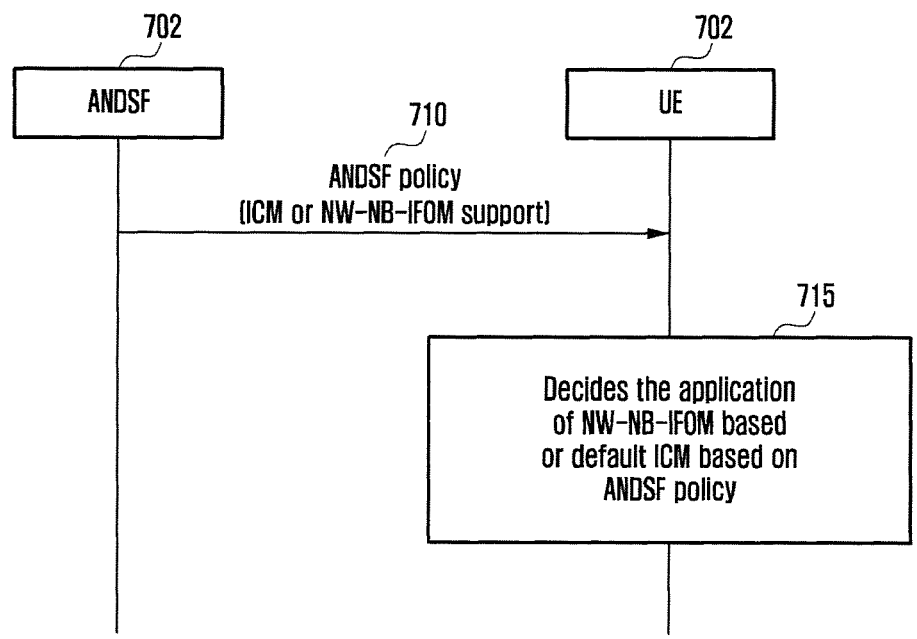
FIG. 7 is a diagram illustrating an operation of a case in which ANDSF is used to determine whether to request initial ICM or network (NW)-initiated IP flow mobility of the user equipment.

FIG. 7 illustrates an operation of a case in which an access network discovery and selection function (ANDSF) is used to determine whether to request initial ICM or NW-initiated IP flow mobility to be applied to the user equipment.

Referring to FIG. 7, ANDSF (702) or user equipment 704 may transmit and receive a signal to and from each other.

In step 710, the ANDSF 702 may transmit policy information to the user equipment 704. According to the embodiment, the policy information includes at least one of information for selecting/searching for the access network or information for a traffic routing decision. Further, the information provided to the user equipment 704 may be called an ANDSF policy or an ANDSF rule. Further, the information may include at least one of the information representing whether to use the ICM and the NW-initiated IP flow mobility to be applied to the user equipment 704. Further, according to the present embodiment, the information may be set per specific APN and may be differently set per the specific APN. The information may be included in a WLAN selection policy, an inter-system mobility policy, an inter-system routing policy, and an inter-APN routing policy or may be included in an IP flow mobility policy.

In step 715, the user equipment 704 stores at least one of information received from the ANDSF 704 and information representing whether to use the ICM or the NW-initiated IP flow mobility and may decide an initial value of the related information when other embodiments of the present invention start based on the same. For example, when the user equipment 704 sets, as the UE_only, the ICM in the ANDSF policy received from a specific PLMN, the user equipment 704 sets, as the UE_only, the ICM of the request message transmitted to the provider network of the corresponding PLMN.

Meanwhile, according to the embodiment, the ANDSF 702 may be an open mobile alliance-device management (OMA-DM) server and the ANDSF policy may be different kinds of information having a form of a management object (MO) of the OMA-DM.

Figure 8:
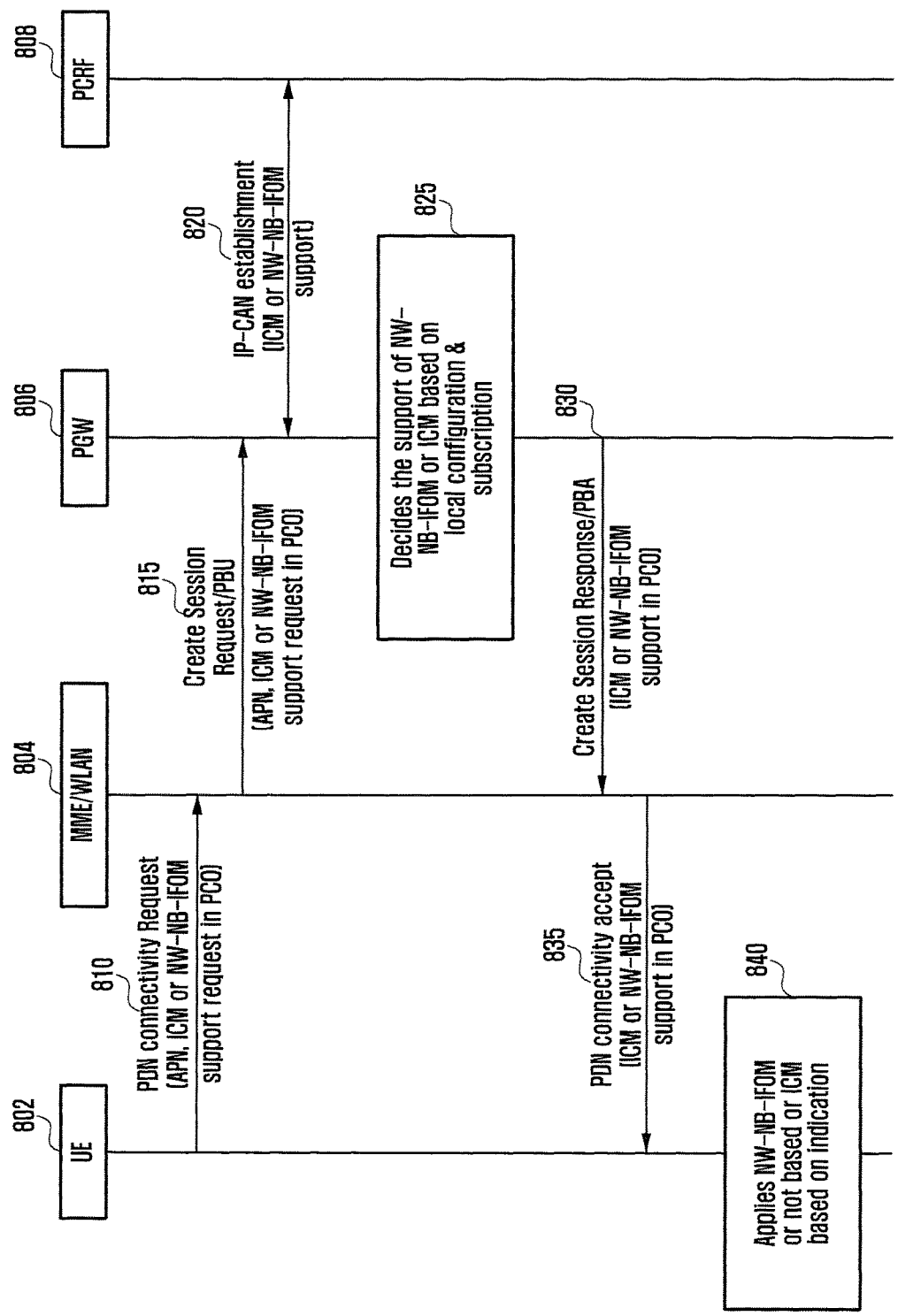
FIG. 8 is a diagram illustrating an operation of exchanging information on IP flow mobility using a protocol configuration option (PCO).

FIG. 8 is a diagram illustrating an operation of exchanging information on IP flow mobility using a protocol configuration option (PCO).

Referring to FIG. 8, according to the embodiment, at least one of user equipment 802, MME/WLAN 804, and PGW 806 or PCRF 808 may each transmit and receive a signal to and from at least one of different entities.

In step 810, the user equipment 802 may transmit a request message for generating the PDN connection to the MME/WLAN 804. According to the embodiment, if the access network is the WLAN and the WLAN is the trusted WLAN, the message may be the WLCP message. Further, when the access network is the E-UTRAN, the message may be the NAS ESM message. Further, the message may be the PDN connectivity request message that may include at least one of the APN and ICM information that the user equipment requests and the information requesting the NW-initiated IP flow mobility. In particular, the ICM information and the NW-initiated IP flow mobility request may be included as one of the protocol configuration option (PCO) included in the message. Further, according to the present embodiment, the information mode may be restrictively applied to the targeted PDN connection.

In step 815, the WLAN network or MME 804 may transmit the message for generating the PDN connection, the create session request message or the PBU message up to the PGW 806, according to the request of the user equipment 806. The message may include at least one of the information requesting the APN and ICM and the NW-initiated IP flow mobility. In particular, when the PCO is included in the message received from the user equipment 802, the WLAN network or MME 804 transmits the received PCO included in the message up to the PGW 806.

The PGW 806 receives the PCO transmitted from the user equipment 802 and receives the ICM information or the request information for the NW-initiated IP flow mobility that is included in the PCO.

In step 825, the PGW 806 decides whether to support the ICM or the NW-initiated IP flow mobility to be applied to the user equipment 802 according to the request. At this time, the PGW 806 may consider the APN requested from the user equipment 802. Further, during the process, the PGW 806 may consider the local configuration and the user subscription information, and in particular, may also use the information received from a separate network node, for example, the PCRF 808. Alternatively, the PGW may transmit the ICM that the user equipment 502 requests to the PCRF as in the step 820 and may again notify the user equipment of the ICM that the PCRF decides. In the embodiment, the operation of the step 820 may be selectively performed.

In step 830, the PGW 806 may transmit the response message to the request to the MME/WLAN 804. According to the embodiment, the response message may be at least one of the create session response and the PBA message. Further, the response message includes whether to support the ICM or the NW-initiated IP flow mobility for the corresponding PDN connection of the decided user equipment 802.

In step 835, the MME/WLAN 804 may transmit the response message to the PDN connection generation request to the user equipment 802. According to the embodiment, if the access network is the WLAN and the WLAN is the trusted WLAN, the message may be the WLCP message and if the access network is the E-UTRAN, the message may be the NAS ESM message. The message may be at least one of the PDN connectivity accept message (in the case of WLCP) or the activate default bearer request (in the case of NAS ESM) and the message may include whether to support the ICM or the NW-initiated IP flow mobility to be applied to the user equipment 802.

In step 840, the user equipment 802 sets the NB-IFOM operation mode, that is, at least one of the UE-only, the NW-only, and the NW and UE depending on when the ICM is included in the received message and then may apply the set mode to the IFOM operation. Alternatively, when the received message includes whether to support the NW-initiated IP flow mobility, the user equipment 802 may determine whether support to the NW-initiated IP flow mobility depending thereon.

Figure 9:
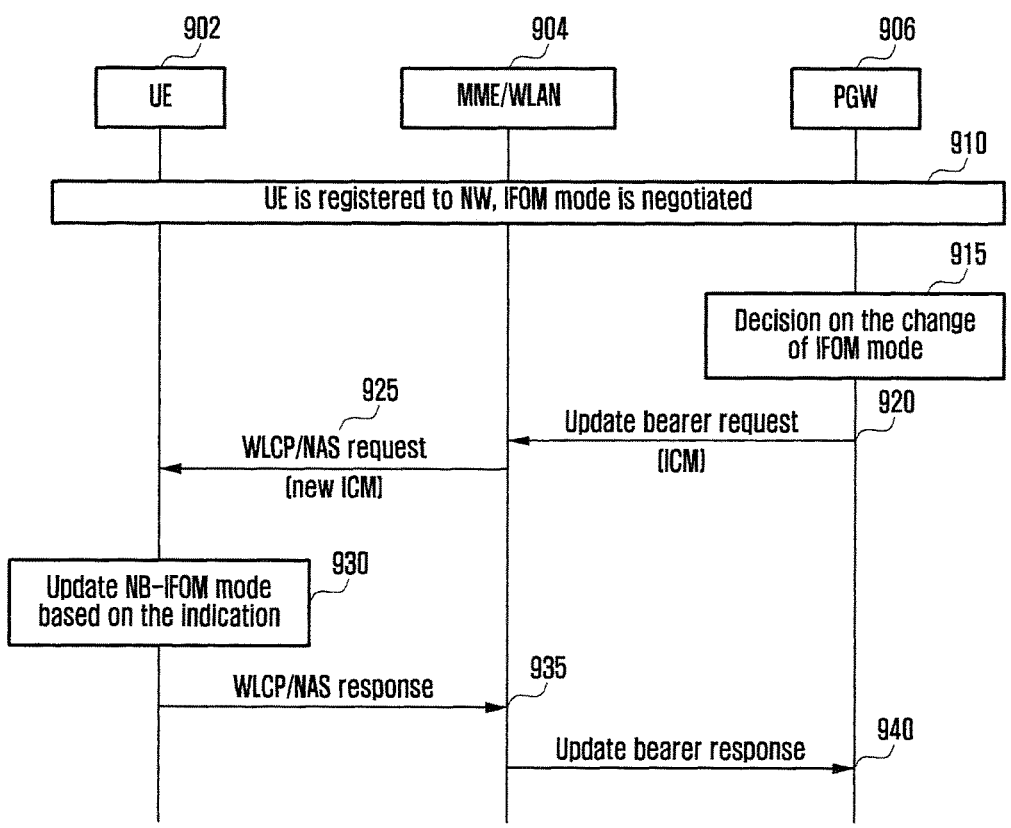
FIG. 9 is a diagram illustrating an operation for changing a node at which IP flow mobility may be initiated, according to the embodiment of the present invention.

FIG. 9 is a diagram illustrating an operation for changing a node at which IP flow mobility may be initiated, according to the embodiment of the present invention.

Referring to FIG. 9, according to the embodiment, user equipment 902, MME/WLAN 904, and PGW 906 may each transmit and receive a signal to and from at least one of different entities.

In step 910, the user equipment 902 is registered in the provider network and the node that may perform the IP flow mobility initiation is decided. According to the embodiment, a method for deciding a node capable of performing IP flow initiation may include the embodiment disclosed in the present specification or a method other than the embodiment.

In step 915, the node of the provider network, for example, the PGW 906 decides to change the ICM for the user equipment 902. This may be decided in consideration of at least one of the local configuration or the network state and the information received from the PCRF. Further, the ICM may be the information set per the PDN connection.

In step 915, the PGW 906 may transmit the message for updating the ICM to the MME/WLAN 904. According to the embodiment, the message used to update the ICM may an update bearer request message that may include the information related to the ICM to be applied to the user equipment 902.

In step 925, the MME/WLAN 904 may transmit the message for notifying the user equipment 902 of the changed ICM. The message used to notifying the changed ICM may be the message using the WLCP protocol and the update connection request when the node transmitting the message is the trusted WLAN and the message may include the information related to the ICM. Alternatively, when the E-UTRAN transmits a message to the user equipment, the message that the MME uses may be the modify EPS bearer context request and the message may include the information related to the ICM.

In step 930, the user equipment 902 may update the mode for the IP flow mobility depending on the ICM included in the received message. The updated information may be applied to the overall PDN or the updated information may be applied only to the currently targeted PDN connection among the PDN connections of the user equipment 902.

In step 935, the user equipment 902 may transmit the response message to the MME/WLAN 904. The response message may be one of the WLCP message and NAS message depending on the received node.

In step 940, the MME/WLAN 904 may transmit the response message to the message received in the step 920 to the PGW 906. According to the embodiment, the response message may be the update bearer response message.

Figure 10:
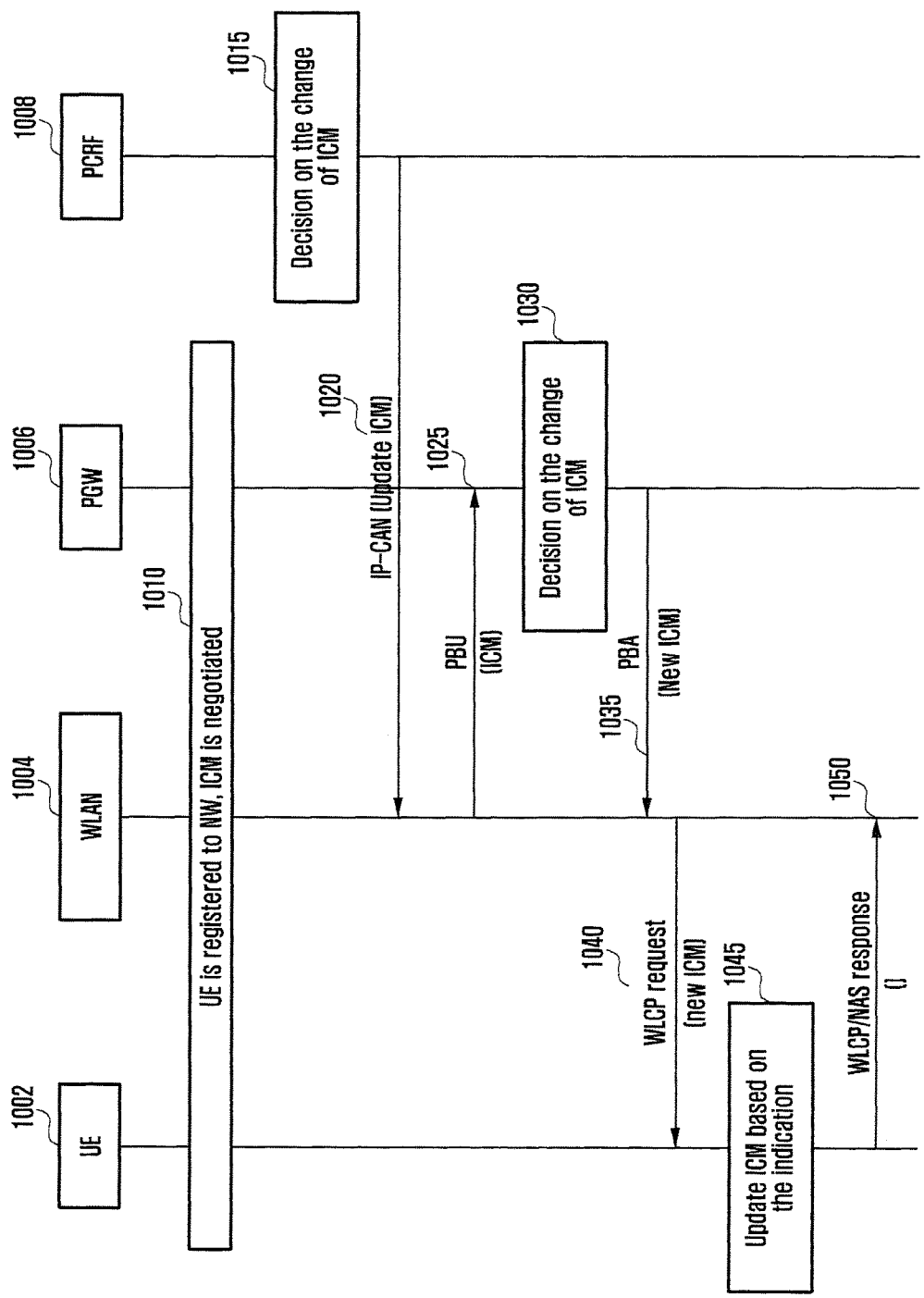
FIG. 10 is a diagram illustrating an operation for changing a node at which IP flow mobility may be initiated, according to another embodiment of the present invention.

FIG. 10 is a diagram illustrating an operation for changing a node at which IP flow mobility may be initiated, according to another embodiment of the present invention.

Referring to FIG. 10, according to the embodiment, at least one of user equipment 1002, WLAN 1004, and PGW 1006 or PCRF 1008 may each transmit and receive a signal to and from at least one of different entities.

In step 1010, the user equipment 1002 is registered in the provider network and the node that may perform the IP flow mobility initiation is decided. According to the embodiment, a method for deciding a node capable of performing IP flow initiation may include the embodiment disclosed in the present specification or a method other than the embodiment.

In step 1015, the node of the provider network, for example, the PGW 1008 may decide to change the ICM for the user equipment 1002. According to the embodiment, the node of the provider network may decide to change the ICM for the user equipment 1002 based on at least one of the local configuration or the network state and the information received from the subscription information server. Further, the ICM may be the information set per the PDN connection.

In step 1020, the PCRF 1008 transmits the message for updating the ICM to the WLAN 1020. According to the embodiment, the message used to update the ICM may be a message using diameter protocols such as a credit-control answer (CCA), a Re-Auth answer (RAA), and an authentication-information answer (AIA) and the message may include the information related to the ICM to be applied to the user equipment 1002.

In step 1025, the WLAN 1004 transmits a request message to change the ICM to the PGW 1006. The message may be the PBU message that may include the information related to the ICM. The information related to the ICM may be decided based on one of the information received in step 1020.

In step 1030, the PGW 1006 may decide the ICM for the user equipment 1002 based on at least one of the received information. According to the embodiment, the PGW 1006 may decide the ICM for the user equipment 1006 based on at least one of the local configuration or the network state of the PGW and the information received from the subscription information server. Further, according to the embodiment, the ICM may be the information set per the PDN connection.

In step 1035, the PGW 1008 transmits the message for notifying the decided ICM for the user equipment 1002 to the WLAN 1004. According to the embodiment, the message to notify the decided ICM may be the PBA message that may include the ICM for the user equipment 1002. The decided ICM may be the same ICM as the ICM that is previously applied to the user equipment or the changed ICM.

In step 1040, the WLAN 1004 may transmit the request message to change the ICM to the user equipment 1002. According to the embodiment, the message used to change the ICM applied to the user equipment 1002 may be the message using the WLCP protocol and the update connection request when the WLAN 1004 is the trusted WLAN and the message may include the ICM.

In step 1045, the user equipment 1002 may update the mode for the IP flow mobility depending on the ICM included in the received message. The updated information may be only to the currently targeted PDN connection among the PDN connections of the user equipment.

In step 1050, the user equipment 1002 may transmit the response message to the request message to the WLAN 1004.

The embodiments of the present invention propose performing a control to determine a subject to start (trigger or initiate) an operation of modifying or generating a routing rule for performing the IP flow mobility between the user equipment and the NW per the PDN connection. However, according to the embodiment, an authority to modify or change the rule that allows the user equipment and the NW to perform the IP flow mobility is negotiated and thus the operation may also be applied in another control unit, for example, per the EPS bearer or the IP flow. In more detail, the unit performing the control to perform the IP flow mobility according to the embodiment of the present invention may be the PDN connection, the EPS bearer, or the IP flow.

According to the embodiment, when the control is applied per the EPS bearer, the control authority negotiation between the user equipment and the NW may be made during the generation of the EPS bearer or the modification of the context of the generated EPS bearer. Further, according to the embodiment, the operation for performing the IP flow mobility per the EPS bearer may be performed even before and after the generation of the EPS bearer or the modification of the context.

That is, the session management request message and the response message that are exchanged between the user equipment and the NW include the information representing whether the IP flow mobility is requested to the EPS bearer or the generation/modification of the rule is permitted to the NW, the user equipment, or both thereof.

Further, according to the embodiment, the application of the control per the IP flow may be made during the process of exchanging the information on the IP flow between the user equipment and the NW. Further, the operation for performing the IP flow mobility may be performed before and after the process of exchanging the information on the IP flow.

That is, the information of the IP flow between the user equipment and the NW, that is, the session management request message and the response message for exchanging the routing rule may include the information whether to request the IP flow mobility to the specific IP flow (or set of the IP flows) or whether the generation/modification of the rule is permitted to the NW the user equipment, or both thereof. The information on whether to permit the generation/modification of the rule may also be included as one element of the routing rule. That is, the information configuring the routing rule including the control information on the IP flow may include the information representing whether the authority that may start to modify or update the routing rule is allocated even to the user equipment or prohibited. The user equipment may perform the request process to modify/update the routing rule as long as the modification for the specific routing rule is permitted.

Meanwhile, describing the embodiments, initiating the mobility for the specific IP flow may include performing at least one of the generation, modification, and deletion of the routing rule for the specific IP flow.

Further, the embodiments describe that whether to permit the initiation of the mobility for the specific IP flow is exchanged between the user equipment and the NW but whether to permit the initiation of the mobility for the specific IP flow may be replaced by a priority concept and applied. In more detail, the negotiated information between the user equipment and the NW (use of the procedure described in the above-mentioned embodiments) may include priority for the IP flow mobility or the routing rule between the user equipment and the NW and when the whole or a part of the routing rule exchanged between the user equipment and the NW collides with each other, or otherwise when the user equipment and the NW simultaneously initiate the IP flow mobility process, the operation may be made based on a request having high priority. For example, when priority higher than the user equipment is allocated to the NW side, the IP flow mobility processes that the NW and the user equipment initialize conflict with each other, and the routing rule is generated or modified, the NW preferentially applies the routing rule depending on the initiation process. The priority information may be set depending on the message transmission/reception of the user equipment or the NW and may also set in a form of changing the priority depending on the specific condition. In more detail, the priority information may be set during the process of exchanging the related information with the IFOM and may include the information on the priority of the node that controls the IFOM.

According to the embodiments of the present specification, the user equipment and the NW explicitly negotiate the mode related to the IFOM operation and are related to the operation depending on the negotiated results.

One of the major points of the present invention includes transmitting or receiving or negotiating the information related to what node the node performing the IP flow mobility or triggering the IP flow mobility between the user equipment and the NW will be to allow the determined node to perform or trigger the IP flow mobility. Therefore, the gist of the present invention may be applied even to the case in which the information representing the process of negotiating, by the user equipment and the NW, who the IP flow mobility is performed is not explicitly exchanged. In more detail, one of the user equipment and the NW may transmit the message associated with the request IP flow mobility to an opponent node and may determine whether the initiation of the IP flow mobility is permitted depending on the message received from the opponent node.

Hereinafter, a method for deciding whether user equipment and NW permit an initiation of IP flow mobility according to the embodiment of the present specification will be described.

Figure 13:
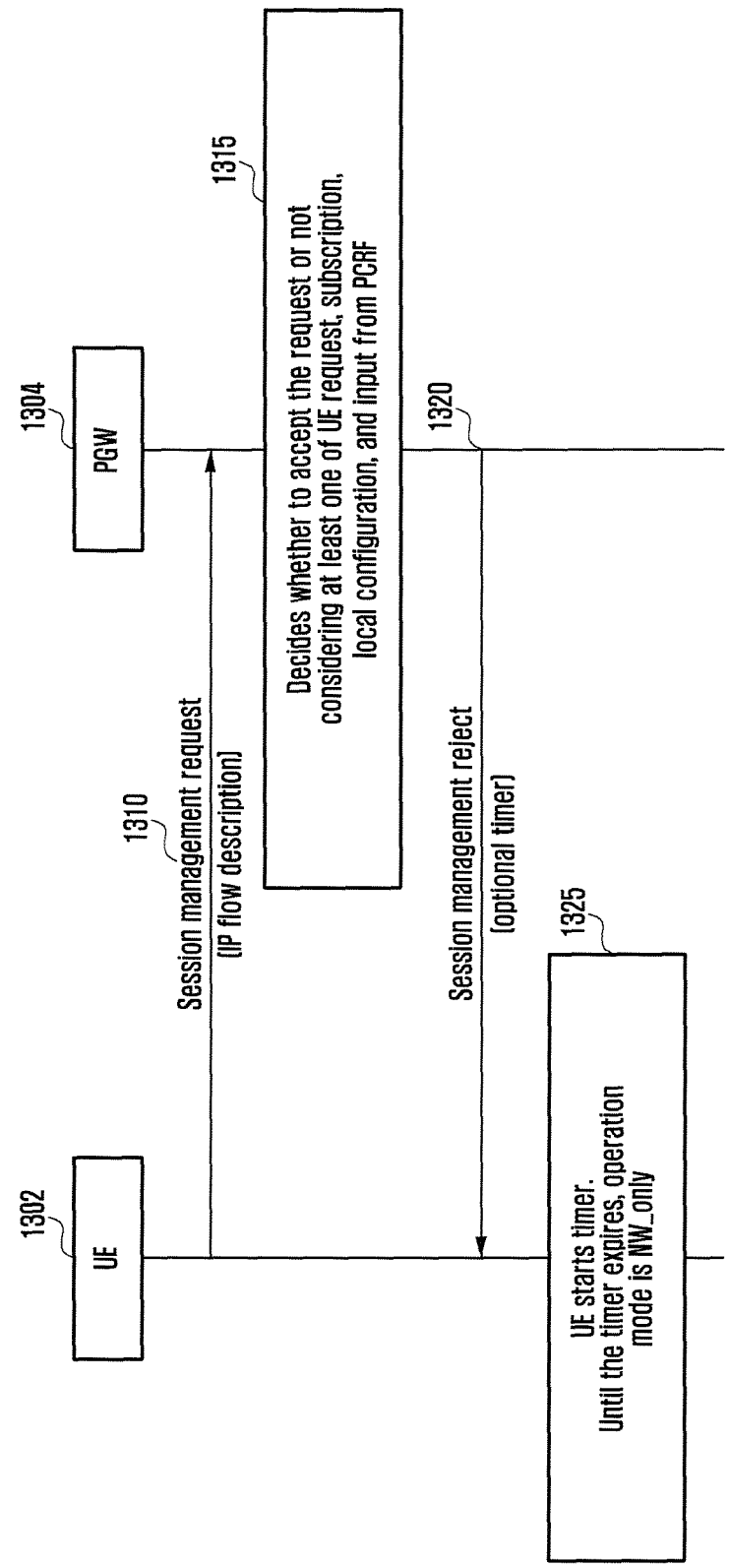
FIG. 13 is a diagram illustrating a method for transmitting and receiving a signal related to an initiation of IP flow mobility between user equipment and a network according to an embodiment of the present invention.

FIG. 13 is a diagram illustrating a method for transmitting and receiving a signal related to an initiation of IP flow mobility between user equipment and a network according to an embodiment of the present invention.

Referring to FIG. 13, user equipment 1302 and PGW 1304 may transmit and receive a signal. The user equipment 1302 and the PGW 1304 may transmit and receive a signal through a base station (not illustrated). According to the embodiment, the PGW 1304 may be called the NW that may also be another network configuring a core network.

In step 1310, the user equipment 1302 may transmit a message for requesting IP flow mobility to the NW 1304. The transmitted message may be a session management request message. The request may also be made when the information that may be used to decide the IP flow mobility, for example, an ANDSF policy, a provider policy, or user preference is set, as a specific value, in the user equipment 1302. Further, the request message transmitted from the user equipment 1302 to the NW 1304 may include at least one of the information on the IP flow that is a request target and the information related to the policy the user equipment 1302 uses. According to the embodiment, the information related to the policy may include the detailed information on whether the user equipment 1302 has the ANDSF policy and on the ANDSF policy.

In step 1315, the NW 1304 may determine whether to accept the IP flow mobility request received from the user equipment 1302 based on at least one of the request of the user equipment 1302, the received information, the local configuration, and the subscription information. Further, according to the embodiment, whether to accept/reject the request may be transmitted to the user equipment 1302 through the session management (SM) message.

According to the embodiment, when the NW 1304 rejects the request, in step 1320, the NW 1304 may transmit a reject message to the user equipment 1302 and the reject message may be a session management reject message. Further, according to the embodiment, the session management reject message may include a timer value.

In step 1325, when the user equipment 1302 does not receive its own request, it may be decided that the user equipment 1302 does not directly initiate the IP flow mobility for the corresponding IP flow but the NW 1304 may decide to initiate the IP flow mobility. That is, rejecting, by the NW 1304, the request of the user equipment 1302 may represent that the operation mode negotiation result with the user equipment 1302 is an NW_only mode. Therefore, if the user equipment 1302 receives the rejection for the request, the user equipment 1302 may be determined as being operated as the NW_only mode. Further, the mode negotiation result may be applied only to the IP flow that is a target when the user equipment 1302 requests the IP flow mobility. Alternatively, the mode negotiation result may also be applied to all the PDN connections included in the IP flow. As such, it may decide the operation mode based on the response result to the IP flow mobility without explicitly exchanging the information between the user equipment 1302 and the NW 1304. Further, the embodiment of FIG. 13 may also be applied while the operation mode may be negotiated between the user equipment 1302 and the NW 1304 according to another embodiment of the present specification and the user equipment 1302 and the NW 1304 may be operated in the negotiated operation mode. As such, when there is a need to selectively change the mode during the operation, the reject message or the permission message may be transmitted to the opponent node to change an operation mode. Further, time to hold the operation mode determined depending on the session management reject message may be decided based on the timer value included in the step 1320. According to the embodiment, the user equipment 1302 drives a timer having the timer value depending on the reception of the session management reject message including the timer value and may decide that the operation mode depending on the session management reject message is valid until the timer expires.

Figure 14:
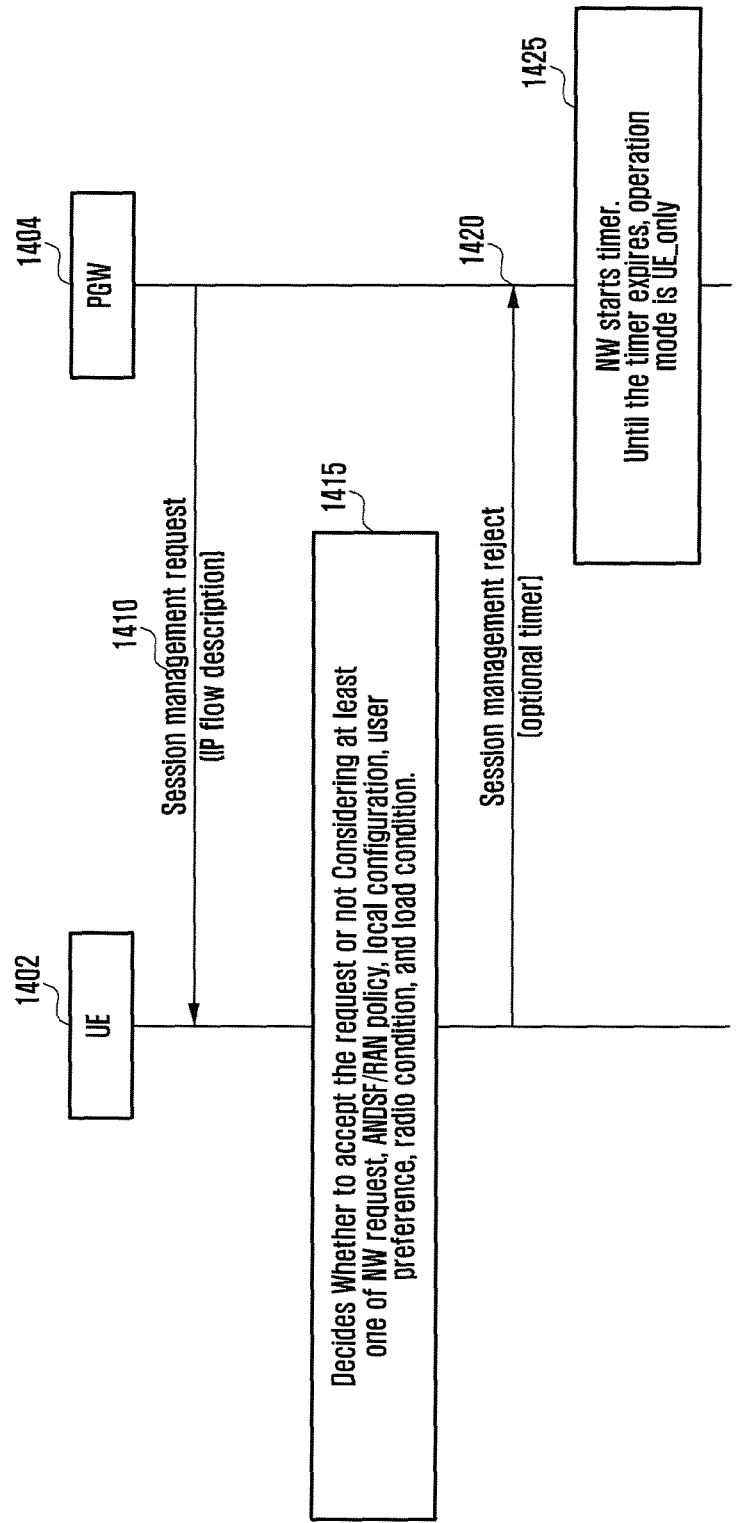
FIG. 14 is a diagram illustrating another method for transmitting and receiving a signal related to an initiation of IP flow mobility between user equipment and a network according to an embodiment of the present invention.

FIG. 14 is a diagram illustrating another method for transmitting and receiving a signal related to an initiation of IP flow mobility between user equipment and a network according to an embodiment of the present invention.

Referring to FIG. 14, user equipment 1402 and PGW 1404 may transmit and receive a signal. The user equipment 1402 and the PGW 1404 may transmit and receive a signal through a base station (not illustrated). According to the embodiment, the PGW 1404 may be called the NW that may also be another network configuring a core network.

According to the embodiment, if the NW 1404 initiates the IP flow mobility, the user equipment 1402 may reject the IP flow mobility request of the NW.

In more detail, in step 1410, the NW 1404 may transmit the message for requesting the IP flow mobility to the user equipment 1402. The transmitted message may be a session management request message. Further, the request message may include the information on the IP flow that is the request target. Further, the request message may be selectively transmitted depending on the subscription information of the user equipment 1402.

In step 1415, the user equipment 1402 may determine whether to accept or reject the received request message. According to the embodiment, rejecting, by the user equipment, the request of the NW may be made based on at least one of a state or a congestion state of a radio channel sensed by the user equipment 1402, the ANDSF policy that the user equipment 1402 is using, and the user preference.

When the user equipment 1402 rejects the request, in step 1420, the user equipment 1402 may transmit the message for rejecting the request to the NW 1404. According to the embodiment, the message for rejecting the request may be the session management reject message. Further, according to the embodiment, the session management reject message may include a timer value. Further, the message for rejecting the request may include rejection causes (for example, deterioration in a channel state, performance impossibility of the ANDSF policy, or the like) of the user equipment 1402 and in the embodiment, the rejection causes of the reject message may be transmitted up to the NW 1404.

If the NW 1404 does not receive its own request, in step 1425, it may be decided that the NW 1404 does not initiate the IP flow mobility for the corresponding IP flow but the user equipment 1402 initiates the IP flow mobility.

That is, according to the embodiment, rejecting, by the user equipment 1402, the request of the NW 1404 may represent that the operation mode negotiation result between the NW 1404 and the user equipment 1402 is the_only mode. Therefore, if the NW 1404 receives the rejection for the request, it may be decided that the NW 1404 needs to be operated as the UE_only mode. The mode negotiation result is applied only to the IP flow that is a target whether the NW requests the IP flow mobility. Alternatively, the mode negotiation result may also be applied to all the PDN connections included in the IP flow.

As such, it may decide the operation mode based on the response result to the IP flow mobility without explicitly exchanging the information between the user equipment 1402 and the NW 1404. Further, the embodiment of FIG. 14 may also be applied while the operation mode may be negotiated between the user equipment 1402 and the NW 1404 according to another embodiment of the present specification and the user equipment 1302 and the NW 1304 may be operated in the negotiated operation mode. As such, when there is a need to selectively change the mode during the operation, the reject message or the permission message may be transmitted to the opponent node to change an operation mode. Further, time to hold the operation mode determined depending on the session management reject message may be decided based on the timer value included in the step 1420. According to the embodiment, the NW 1402 drives a timer having the timer value depending on the reception of the session management reject message including the timer value and may decide that the operation mode depending on the session management reject message is valid until the timer expires.

Meanwhile, according to the two embodiments of FIGS. 13 and 14, the initial operation mode of the user equipment and the NW may be the NW and UE modes. If the operation mode is initialized by the expiration of the timer, or the like, the operation modes of the user equipment and the NW may be changed to the NW and UE modes, such that the IP flow mobility may be initialized at both of the NW and the user equipment. Further, according to the two embodiments, when the timer value is included in the request reject message, it may be decided that the entity receiving the request reject message decides the operation mode depending on the request reject message.

Meanwhile, in the first half of the embodiment of the present specification as well as the present embodiment, the operation mode associated with the IP flow mobility is set and then the operation mode is initialized but performing the renegotiation process may be made using the timer. If the IP flow mobility request of the user equipment is rejected and thus the user equipment is operated as the NW_only mode, it is decided that the user equipment starts the timer at the time of the reception of the message and the negotiated mode is valid until the timer expires. If the timer expires, the negotiated mode may be initialized or the renegotiation process may be performed. Further, when the entity rejecting the request is decided, the timer value may be transmitted to the receiving entity while being included in the reject message. As such, the same timer value may be transmitted and thus the timer having the same value between the two entities may be driven.

Meanwhile, as described above, the IP flow mobility that the user equipment starts may be applied when a policy, a rule, or a configuration that may be used at the time of using the IP flow mobility is present in the user equipment. Similarly, the IP flow mobility that the NW starts may be applied when there is a policy that may be used when the NW performs the IP flow mobility, for example, an extended PCC rule.

If the information capable of performing the IP flow mobility is present in both of the user equipment and the NW, the user equipment and the NW according to the embodiments of the present specification may perform a negotiation what entity is a subject of the IP flow mobility. At this time, the following priority may be used.

If the information (at least one of ANDSF policy, user preference, and local operation environment) capable of performing the IP flow mobility is present in the user equipment and the information (for example, PCC rule for the IP flow mobility) is not present in the NW, UE initiated IP flow mobility is used (that is, negotiated in the UE-only mode or operated in the UE and NW modes).

To this end, the user equipment may include the information representing that it includes the information or the policy (for example, ANDSF policy) capable of performing the IP flow mobility in the session management message (PDN connectivity request, or the like) transmitted to the provider network. The user equipment may additionally transmit information that represents a kind of information (one of the ANDSF policy, the user preference, and the local operating environment) included therein or information that represents whether the ANDSF policy is received from the HPLMN or received from the RPLMN if the ANDSF policy is present.

Differently from this, the user equipment may request the use of the UE-only mode only when it has the information or the policy capable of performing the IP flow mobility. That is, the user equipment is permitted to request the use of the UE-only mode to the NW as long as it has the valid ANDSF policy.

If the rule to be used when the IP flow mobility is performed is not present in the NW, the NW permits the request of the user equipment (use of the UE-only mode).

If the user equipment has the information or the policy capable of using the IP flow mobility and the NW also he rule capable of using the IP flow mobility, the NW decides in which mode the user equipment is operated in consideration of a kind of information of the user equipment and a subject (HPLMN or VPLMN) providing the information, the subscription information of the user, and the local configuration of the NW.

In more detail, if the user equipment has a policy received from the HPLMN (H-ANDSF) or set by the HPLMN, when the user equipment is roaming (connected to the VPLMN), the rule capable of performing the IP flow mobility is present in the NW, and the PDN connection that is a current target is generated as a local breakout (LBO), the NW of the VPLMN determines whether to use the information of the user equipment (that is, use of UE-initiated NBIFOM) in consideration of both of a roaming contract with the HPLMN and the local configuration. At this point, the above-mentioned user equipment uses the IP flow mobility related information (ANDSF policy and a kind of provided provider) provided through the session management message. Generally, under the situation, the information provided from the HPLMN to the user equipment may have priority higher than the rule of the NW.

Like the embodiment, if the user equipment has a policy received from the HPLMN (H-ANDSF) or set by the HPLMN, when the user equipment is roaming (connected to the VPLMN), the rule capable of performing the IP flow mobility is present in the NW, and the PDN connection that is a current target is generated as home routed (HR), the NW of the HPLMN determines whether to use the information of the user equipment (that is, use of UE-initiated NBIFOM) in consideration of both of a roaming contract with the VPLMN and the local configuration. At this point, the above-mentioned user equipment uses the IP flow mobility related information (ANDSF policy and a kind of provided provider) provided through the session management message. Generally, under the situation, the rule of the NW of the HPLMN may have priority higher than the information provided to the user equipment.

It is assumed that the user equipment has the policy received from the VPLMN (V-ANDSF) or set by the VPLMN. If the user equipment is roaming (connected to the VPLMN), the rule capable of performing the IP flow mobility is present in the NW, and the PDN connection that is a current target is generated as the home routed (HR), the NW of the HPLMN determines whether to use the information of the user equipment (that is, use of UE-initiated NBIFOM) in consideration of both of a roaming contract with the VPLMN and the local configuration. At this point, the above-mentioned user equipment uses the IP flow mobility related information (ANDSF policy and a kind of provided provider) provided through the session management message. Generally, under the situation, the rule of the NW of the HPLMN may have priority higher than the information provided to the user equipment.

Like the embodiment, if the user equipment has a policy received from the VPLMN (V-ANDSF) or set by the VPLMN, when the user equipment is roaming (connected to the VPLMN), the rule capable of performing the IP flow mobility is present in the NW, and the PDN connection that is a current target is generated as the local breakout (LBO), the NW of the VPLMN may determine whether to use the information of the user equipment (that is, use of UE-initiated NBIFOM) in consideration of both of a roaming contract with the HPLMN and the local configuration. At this point, the above-mentioned user equipment may use the IP flow mobility related information (ANDSF policy and a kind of provided provider) provided through the session management message. Generally, under the situation, the rule of the NW of the VPLMN may have priority higher than the information provided to the user equipment.

Meanwhile, both of the user equipment and the NW have the information to be used at the time of performing the IP flow mobility, a determination on which of them is preferentially used may be made while allocating the high priority to the information (for example, ANDSF policy such as ISRP and ISMP) of the user equipment. The reason is that the ANDSF policy and the information set in the user equipment may be specialized and the user equipment may consider the state information that may be directly measured, for example, the congestion state or the channel (radio) state. That is, if the user equipment requests the use of the UE-only mode, the NW may select the IP flow mobility mode according to the request of the user equipment. At this time, the user equipment may transmit information representing that the cause of the UE-only mode request is that the information capable of performing the IP flow mobility is set in the user equipment, including the information in the session management request message.

If the NW requests the use of the NW-only mode to the user equipment, the user equipment may determine whether to grant the request based on the request of the NW and the information of the user equipment, that is, the ANDSF policy, the user preference, and the local configuration. The user equipment may reject the use of the NW-only mode of the NW and transmit the cause information representing the rejection cause, including the cause information in the session management reject message. For example, when the user equipment has the valid ANDSF policy, the user equipment may reject the use of the NW-only mode of the NW. At this point, the cause information representing that the rejection is rejected due to the ANDSF policy is included in the session management reject message. Similarly, when the use of the NW-only mode is not permitted due to the user preference, the user equipment may notify the clause while rejecting the use of the NW only mode.

Meanwhile, the user equipment may reject the request of the NW based on the congestion state or the channel state (radio state or coverage loss state). The request of the NW is the request of the use of the NW-only mode or an IP flow mobility command after the negotiation by the NW-only mode. If the user equipment rejects the request of the NW, the user equipment may transmit the session management reject message including the rejection cause (when the congestion state of the targeted access network is equal to or more than a predetermined level, the channel state is equal to or less than a predetermined level, or the coverage loss occurs) to the NW.

Figure 11:
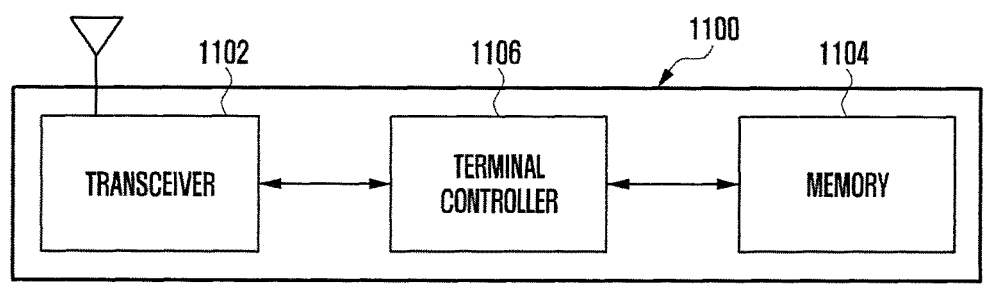
FIG. 11 is a diagram illustrating user equipment according to an embodiment of the present invention.

FIG. 11 is a diagram illustrating user equipment according to an embodiment of the present invention.

Referring to FIG. 11, the user equipment 1100 according to the embodiment may include at least one of a transceiver 1102, a memory 1104, and a terminal controller 1106.

The transceiver 1102 may transmit and receive a signal to and from other entities. According to the embodiment, the other entities may include at least one of the base station and the wireless LAN and the information may be transmitted and received to and from the other entities.

The memory 1104 may store at least one of the information associated with the operation of the user equipment 1100 and the information transmitted and received through the transceiver 1102.

The terminal controller 1106 may control the operations of the transceiver 1102 and the memory 1104 and may control the operation of the user equipment disclosed in the embodiment.

Figure 12:
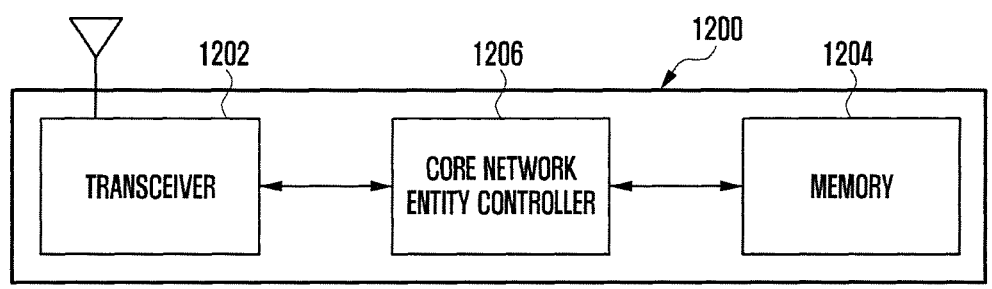
FIG. 12 is a diagram illustrating core network entity according to an embodiment of the present invention.

FIG. 12 is a diagram illustrating core network entity according to an embodiment of the present invention. The core network entity may be at least one of WLAN, MME, SGW, PGW, and PCRF.

Referring to FIG. 12, the core network entity 1200 according to the embodiment may include at least one of a transceiver 1204 and a core network entity controller 1206.

The transceiver 1202 may transmit and receive a signal to and from other entities. According to the embodiment, the other entities may be at least one of user equipment, WLAN, MME, SGW, PGW, and PCRF.

The memory 1204 may store at least one of the information associated with the operation of the core network entity 1200 and the information transmitted and received through the transceiver 1202.

The core network entity controller 1206 may control the operations of the transceiver 1202 and the memory 1204 and may control the operation of the core network entity disclosed in the embodiment.

In the foregoing exemplary embodiments of the present invention, all the steps may be selectively performed or omitted. Further, steps in each exemplary embodiment are not necessarily performed in order and may be performed in reverse. Meanwhile, the exemplary embodiments of the present disclosure described in the present specification and shown in the accompanying drawings are only specific examples provided in order to easily describe technical contents of the present disclosure and assist in the understanding of the present disclosure, and are not to limit the scope of the present disclosure. That is, it is obvious to those skilled in the art to which the present invention pertains that various modifications may be made without departing from the scope of the present invention, in addition to the exemplary embodiments disclosed herein.

Meanwhile, although the exemplary embodiments of the present invention have been illustrated in the present specification and the accompanying drawings and specific terms have been used, they are used in a general meaning in order to assist in the understanding the present invention and do not limit the scope of the present invention. It is obvious to those skilled in the art to which the present invention pertains that various modifications may be made without departing from the scope of the present invention, in addition to the exemplary embodiments disclosed herein.

The invention claimed is:

1. A method by a terminal in a mobile communication system, the method comprising:
    transmitting first information and second information, the first information indicating that the terminal has a policy associated with a mobility control for a specific IP flow and the second information indicating whether the policy is received from one of a home public land mobile network (HPLMN), a visited PLMN (VPLMN), or a registered PLMN (RPLMN);
    transmitting, to a packet data network gateway (PGW), a first message for requesting the mobility control for the specific IP flow;
    receiving, from the PGW, a second message including third information whether to accept the mobility control for the specific IP flow, the third information being determined based on the first information and the second information;
    initiating the mobility control for the specific IP flow in case that the information indicates to accept the mobility control for the specific IP flow; and
    identifying that the mobility control for the specific IP flow is to be initiated by the PGW in case that the third information indicates not to accept the mobility control for the specific IP flow.

2. The method of claim 1, wherein the second message further includes a value for a timer in case that the information indicates reject the mobility control for the specific IP flow, and
    wherein the identification that the mobility control for the specific IP flow is to be initiated by the PGW is maintained until the timer is expired.

3. The method of claim 1, wherein the mobility control is requested and initiated per a PDN connection, or a bearer instead of the IP flow based on the third information.

4. The method of claim 1, wherein the third information further includes node information on the mobility control for the specific IP flow.

5. A method by a packet data network gateway (PGW) in a mobile communication system, the method comprising:
    receiving, from a terminal, first information and second information, the first information indicating that the terminal has a policy associated with a mobility control for a specific IP flow and the second information indicating whether the policy is received from one of a home public land mobile network (HPLMN), a visited PLMN (VPLMN), or a registered PLMN (RPLMN);
    receiving, from the terminal, a first message to request the mobility control for the specific IP flow; and
    transmitting, to the terminal, a second message including third information whether to accept the mobility control for the specific IP flow, the third information being determined based on the first information and the second information,
    wherein the mobility control for the specific IP flow is initiated, by the terminal, in case that the third information indicates to accept the mobility control for the specific IP flow, and
    wherein the mobility control for the specific IP flow is to be initiated, by the PGW, in case that the third information indicates not to accept the mobility control for the specific IP flow.

6. The method of claim 5, wherein the second message further includes a value for a timer in case that the information indicates reject the mobility control for the specific IP flow, and
    wherein identification that the mobility control for the specific IP flow is to be initiated by the PGW is maintained until the timer is expired, by the terminal.

7. The method of claim 5, the mobility control is requested and initiated per a PDN connection, or a bearer instead of the IP flow based on the third information.

8. A terminal of a mobile communication system, the terminal comprising:
    a transceiver; and
    a processor coupled with the transceiver and configured to control to:
    transmit first information and second information, the first information indicating that the terminal has a policy associated with a mobility control for a specific IP flow and the second information indicating whether the policy is received from one of a home public land mobile network (HPLMN), a visited PLMN (VPLMN), or a registered PLMN (RPLMN),
    transmit, to a packet data network gateway (PGW), a first message to request the mobility control for the specific IP flow,
    receive, from the PGW, a second message including third information whether to accept the mobility control for the specific IP flow, the third information being determined based on the first information and the second information,
    initiate the mobility control for the specific IP flow in case that the third information indicates to accept the mobility control for the specific IP flow, and
    identify that the mobility control for the specific IP flow is to be initiated by the PGW in case that the third information indicates not to accept the mobility control for the specific IP flow.

9. The terminal of claim 8,
wherein the second message further includes a value for a timer in case that the information indicates reject the mobility control for the specific IP flow, and
wherein the identification that the mobility control for the specific IP flow is to be initiated by the PGW is maintained until the timer is expired.

10. The terminal of claim 8, wherein the mobility control is requested and initiated per a PDN connection, or a bearer instead of the IP flow based on the third information.

11. The terminal of claim 8, wherein the processor is further configured to control a connection per a PDN connection, a bearer, or an IP flow based on the third information.

12. A packet data network gateway (PGW) of a mobile communication system, the PGW comprising:
  a transceiver; and
  a processor coupled with the transceiver and configured to control to:
  receive, from a terminal, first information and second information, the first information indicating that the terminal has a policy associated with a mobility control for a specific IP flow and the second information indicating whether the policy is received from one of a home public land mobile network (HPLMN), a visited PLMN (VPLMN), or a registered PLMN (RPLMN),
  receive, from terminal, a first message to request the mobility control for the specific IP flow, and
  transmit, to the terminal, a second message including third information whether to accept the mobility control for the specific IP flow, the third information being determined based on the first information and the second information,
wherein the mobility control for the specific IP flow is initiated, by the terminal, in case that the third information indicates to accept the mobility control for the specific IP flow, and
wherein the mobility control for the specific IP flow is to be initiated, by the PGW, in case that the third information indicates not to accept the mobility control for the specific IP flow.

13. The PGW of claim 12,
wherein the second message further includes a value for a timer in case that the information indicates reject the mobility control for the specific IP flow, and
wherein identification that the mobility control for the specific IP flow is to be initiated by the PGW is maintained until the timer is expired, by the terminal.

14. The PGW of claim 12, wherein the third information further includes node information on the mobility control for the specific IP flow.

15. The PGW of claim 12, the mobility control is requested and initiated per a PDN connection, or a bearer instead of the IP flow based on the third information.

* * * * *